(12) United States Patent
Cheng

(10) Patent No.: US 8,698,047 B2
(45) Date of Patent: *Apr. 15, 2014

(54) DEVICE FOR HEATING A GOLF BALL

(71) Applicant: Nike, Inc., Beaverton, OR (US)

(72) Inventor: Chia-Chyi Cheng, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 13/631,591

(22) Filed: Sep. 28, 2012

(65) Prior Publication Data

US 2013/0020306 A1 Jan. 24, 2013

Related U.S. Application Data

(63) Continuation of application No. 12/604,830, filed on Oct. 23, 2009, now Pat. No. 8,283,603.

(51) Int. Cl.
H05B 3/02 (2006.01)
H05B 3/06 (2006.01)
A63B 45/00 (2006.01)

(52) U.S. Cl.
USPC .......... 219/243; 219/524; 219/525; 425/116; 425/577

(58) Field of Classification Search
None
See application file for complete search history.

(56) References Cited

U.S. PATENT DOCUMENTS

| 1,533,563 | A | 4/1925 | Sabatino |
| 1,595,409 | A | 8/1926 | Kerr |
| 2,181,821 | A | 11/1939 | Seals |
| 2,260,689 | A | 10/1941 | Miller |
| 2,787,024 | A | 4/1957 | Smith |
| 3,062,944 | A | 11/1962 | Grandel |

(Continued)

FOREIGN PATENT DOCUMENTS

| CA | 2716534 | 5/2012 |
| CN | ZL201020571907.0 | 5/2011 |

(Continued)

OTHER PUBLICATIONS

Examiner's Report in Australian Patent Application No. 2010235974, mailed on Nov. 9, 2011.

(Continued)

Primary Examiner — Joseph M Pelham
(74) Attorney, Agent, or Firm — Plumsea Law Group, LLC

(57) ABSTRACT

The present disclosure relates to a handheld clamp device for applying heat to a golf ball. The clamp may have two lever arms each attached at one end to a pivot. A golf ball receiving unit may be attached to each lever arm at the opposite end as the pivot. Each golf ball receiving unit may include a heating element. The internal heating surface of each golf ball receiving unit may contain a pattern, which can be a dimple pattern. When in use, the handheld device may heat the surface of a golf ball such that the pattern on the internal heating surfaces forms a dimple pattern into the surface of the golf ball. The handheld clamp device may be included as part of a kit, along with multiple sets of golf ball receiving units, and sometimes at least one golf ball.

22 Claims, 18 Drawing Sheets

(56) References Cited

U.S. PATENT DOCUMENTS

| | | | |
|---|---|---|---|
| 3,147,324 A | | 9/1964 | Ward |
| 3,216,058 A | | 11/1965 | Glaser |
| 3,497,676 A | | 2/1970 | Gravatt |
| 3,963,898 A | * | 6/1976 | Tuckwell .................. 219/524 |
| 4,011,431 A | * | 3/1977 | Levin ...................... 219/524 |
| 4,091,720 A | * | 5/1978 | Wheeler ................... 99/375 |
| 4,386,900 A | * | 6/1983 | Sultan ..................... 425/279 |
| 5,181,717 A | | 1/1993 | Donntag et al. |
| 5,190,294 A | | 3/1993 | Oka |
| 5,390,932 A | * | 2/1995 | Russo, Sr. ................. 473/377 |
| 5,569,418 A | * | 10/1996 | Russo, Sr. ................. 264/36.12 |
| 6,130,411 A | * | 10/2000 | Rockenfeller et al. ........ 219/392 |
| 6,171,091 B1 | | 1/2001 | Bettencourt |
| 6,555,795 B2 | * | 4/2003 | Glucksman et al. ....... 219/450.1 |
| 6,575,846 B1 | | 6/2003 | Boehm et al. |
| 6,699,027 B2 | | 3/2004 | Murphy et al. |
| 6,776,731 B2 | | 8/2004 | Shannon et al. |
| 7,053,337 B2 | * | 5/2006 | Ragan et al. ............... 219/386 |
| 8,021,590 B2 | * | 9/2011 | Kuttappa ................... 264/279.1 |
| 8,283,603 B2 | | 10/2012 | Cheng |
| 2004/0217109 A1 | * | 11/2004 | Chang ...................... 219/525 |
| 2006/0249506 A1 | * | 11/2006 | Robertson ................. 219/450.1 |
| 2006/0261514 A1 | | 11/2006 | Yokota et al. |
| 2008/0081710 A1 | | 4/2008 | Chen et al. |
| 2008/0317892 A1 | * | 12/2008 | Aoyama et al. ............. 425/116 |
| 2012/0024451 A1 | | 2/2012 | Lin et al. |

FOREIGN PATENT DOCUMENTS

| | | |
|---|---|---|
| DE | 4323641 A1 | 1/1995 |
| JP | 60124386 A | 7/1985 |
| JP | 2305579 | 12/1990 |
| JP | 2000288126 | 10/2000 |
| JP | 2001212264 | 8/2001 |
| KR | 20-1997-0020926 | 12/1998 |
| KR | 10-0723602 B1 | 6/2007 |
| KR | 1033453 | 4/2011 |

OTHER PUBLICATIONS

Notice of Acceptance in Australian Patent Application No. 2010235974, mailed on Nov. 9, 2012.
Notice of Allowance in Canadian Patent Application No. 2,716,534, mailed on Sep. 15, 2011.
Notification of Grant of Patent Right for Utility Model in Chinese Utility Patent Applicatin No. 2010205710907.0, mailed on Feb. 24, 2011.
First Office Action in Chinese Invention Patent Application No. 201010515502.X, mailed on Mar. 21, 2012.
Second Office Action in Chinese Invention Patent Application No. 201010515502.X, mailed on Aug. 10, 2012.
Third Office Action in Chinese Invention Patent Application No. 201010515502.X, mailed on Nov. 19, 2012.
Communication pursuant to Article 94(3) EPC in European Patent Application No. EP10 188 445.0, mailed on Dec. 27, 2011.
Response to the Official Communication in European Patent Application No. EP10 188 445.0, mailed on May 7, 2012.
Communication under Rule 71(3) in European Patent Application No. EP10 188 445.0, mailed on Aug. 8, 2013.
Office Action in Japanese Patent Application No. 2010-236865, issued on Dec. 21, 2012.
Korean Prior Art Search Report in Korean Patent Application No. 10-2010-0103585, issued on Nov. 12, 2010.
Notice of Decision for Patent in Korean Patent Application No. 10-2010-0103585, issued on Feb. 1, 2011.
Office Action in U.S. Appl. No. 12/604,830, mailed on Oct. 11, 2011.
Final Office Action in U.S. Appl. No. 12/604,830, mailed on Feb. 21, 2012.
Notice of Allowance and Fees Due in U.S. Appl. No. 12/604,830, mailed on Jun. 7, 2012.
Corrected Notice of Allowance and Fees Due in U.S. Appl. No. 12/604,830, mailed on Jul. 27, 2012.
Canadian Office Action dated Feb. 9, 2011 in Canadian Patent Application No. 2,716,534.
Extended European Search Report in European Patent Application No. EP10188445.0, mailed on Feb. 11, 2011.

* cited by examiner

DEVICE FOR HEATING A GOLF BALL

CROSS REFERENCE TO RELATED APPLICATIONS

This application is a Continuation of U.S. Pat. No. 8,283,603, currently U.S. application Ser. No. 12/604,830, entitled "Device For Heating A Golf Ball", filed on Oct. 23, 2009, which is incorporated herein by reference in its entirety.

BACKGROUND

The present disclosure relates to a handheld clamp device for applying heat to a golf ball.

The game of golf is an increasingly popular sport at both the amateur and professional levels. A wide range of technologies related to the manufacture and design of golf balls are known in the art. Such technologies have resulted in golf balls with better performance and longer durability. However, golf balls nonetheless continue to suffer from several deficiencies.

For example, the cover layer of a golf ball will wear out and degrade over time due to repeated impacts with a golf club. Although materials used in the cover layer are generally resilient, the cover layer will eventually crack due to the blunt force of being hit by a golf club. The golf ball then exhibits less than optimal play characteristics, and the ball will ultimately become unusable. Amateur golfers generally prefer to minimize the costs of purchasing new golf balls. Therefore, a variety of methods and systems have been developed to repair the surface layer of a golf ball.

As another example, a golfer may be required to purchase several sets of golf balls in order to achieve different play characteristics. For example, different dimple patterns may affect the aerodynamic properties of the golf ball during flight, or a difference in hardness may affect the rate of backspin. A golfer may therefore wish to carry and use several sets of golf balls in order to achieve the desired play characteristics over the course of a round of golf. Namely, a golfer may use one type of golf ball for driving and another for putting. This presents an inconvenience to the golfer, as well as increased costs.

Both of the above discussed deficiencies can be addressed by applying heat to a golf ball. However, known methods and devices for applying heat to a golf ball are generally inadequate for a variety of reasons. For example, current methods for repairing golf balls with heat use equipment that is generally bulky and expensive. Such equipment generally cannot be used by a golfer, but is instead industrial scale machinery. Furthermore, known portable golf ball heaters merely warm a golf ball so as to protect from cold weather, and so generally do not attain sufficiently high temperatures to achieve the above discussed effects.

Therefore, there is a need in the art for a system and method that addresses the shortcomings of the prior art discussed above.

SUMMARY

The present disclosure relates to a handheld clamp device for applying heat to a golf ball. The device may have two lever arms, each attached at one end to a pivot. A golf ball receiving unit for holding a golf ball may be attached to each of the lever arms at the opposite end as the pivot. Each golf ball receiving unit may include a heating element, and may be made up of an external housing and an internal heating surface.

In another aspect, the internal heating surface of each golf ball receiving unit may contain a pattern. The pattern can be the reverse of a desired pattern to be formed on the surface of a golf ball. The pattern on the internal heating surface may be a dimple pattern. When in use, the handheld device may heat the surface of a golf ball such that the pattern on the internal heating surfaces forms a dimple pattern into the surface of the golf ball.

The handheld clamp device may be included as part of a kit, along with a set of multiple golf ball receiving unit pairs, and sometimes one or more golf ball. In this embodiment, each of the several pairs of golf ball receiving units may include different patterns therein. These patterns may be different dimple patterns. In some embodiments, these different patterns may correspond to different play characteristics of a golf ball. These different patterns may also have a constant total dimple volume.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, a device for heating a golf ball according to an embodiment of the disclosure can be made up of any structure having two lever arms, two golf ball receiving units and a pivot that is sufficiently small in size so as to be operated in a handheld manner, and applies heat to a golf ball.

Figure 1:
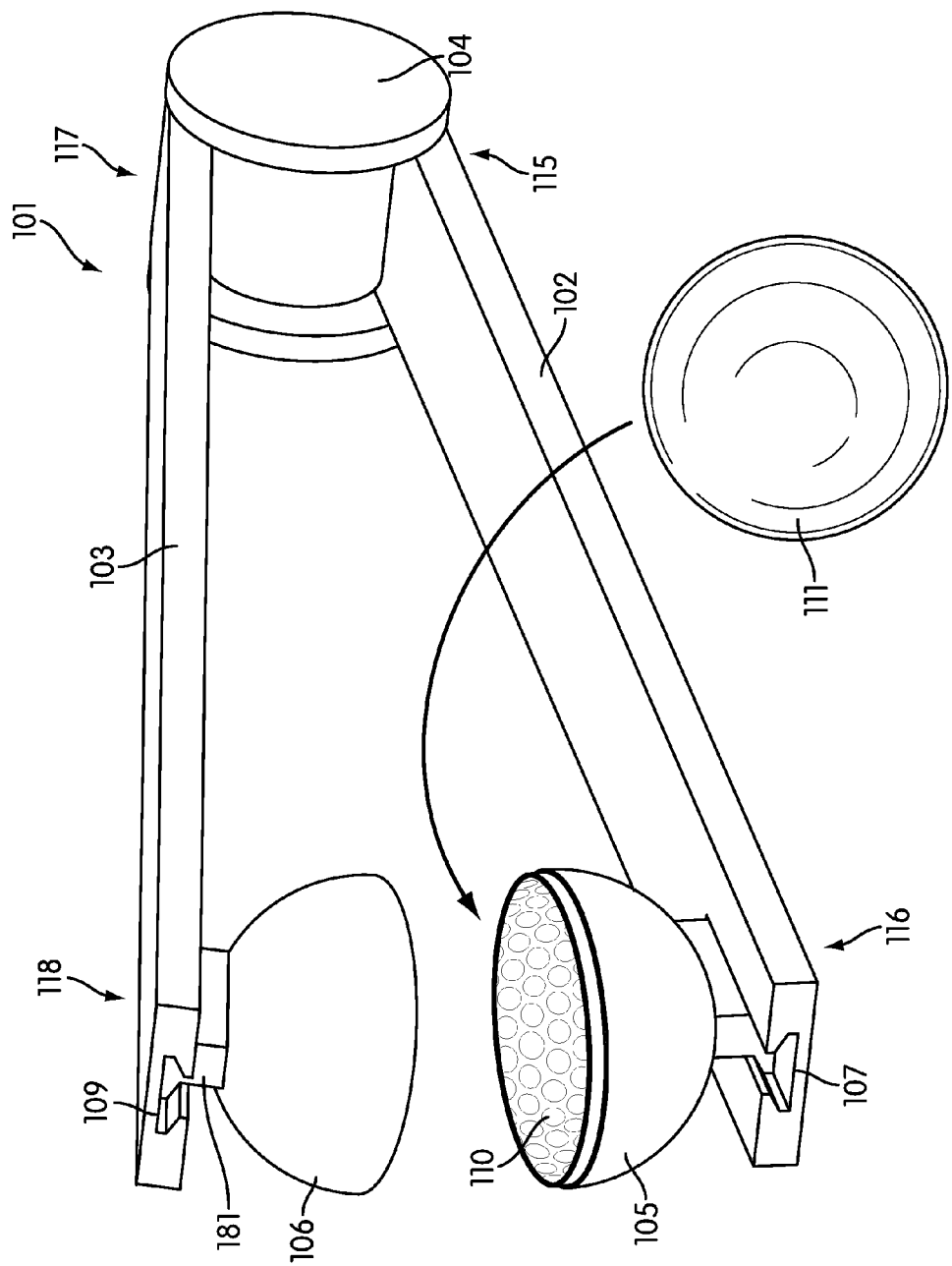
FIG. 1 shows one embodiment of a handheld clamp device, and an associated golf ball that lacks dimples.

One embodiment of a handheld clamp device for heating a golf ball is shown in FIG. 1. In FIG. 1, a handheld clamp device 101 is made up of a first lever arm 102 and a second lever arm 103. For reference, each lever arm can be considered to have a proximal end and a distal end. Specifically, first lever arm 102 has a proximal end 115 and a distal end 116, while second lever arm 103 has a proximal end 117 and a distal end 118.

Each of the first lever arm 102 and the second lever arm 103 can be associated with a golf ball receiving unit at each distal end. Specifically, a first golf ball receiving unit 105 can be associated with the distal end 116 of the first lever arm 102, and a second golf ball receiving unit 106 can be associated with the distal end 118 of the second lever arm 103.

At the proximal ends, each lever arm can be attached to a pivot 104. Namely, first lever arm 102 can be attached to the pivot at proximal end 115, and second lever arm 103 can be attached to the pivot at proximal end 117.

Figure 2:
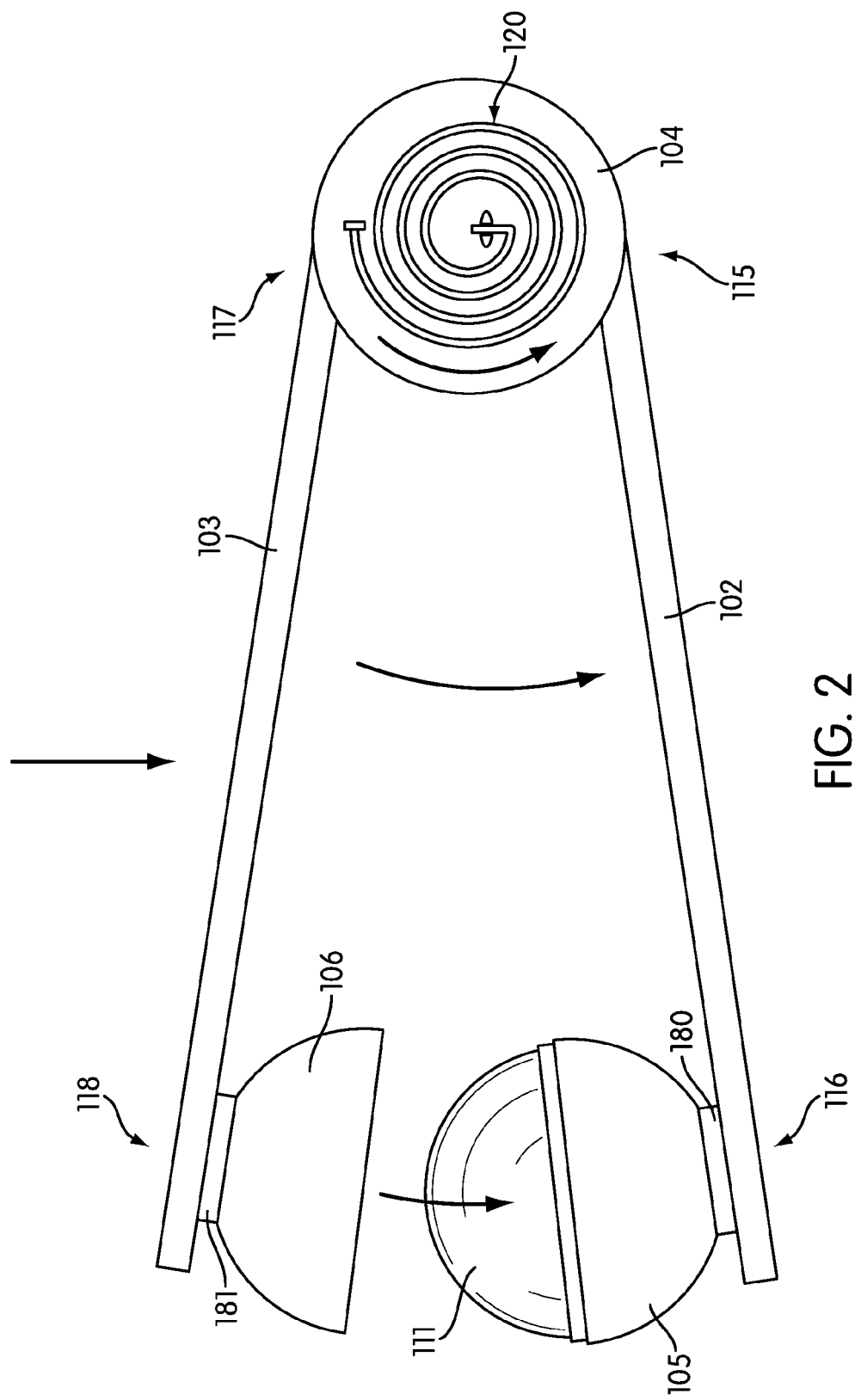
FIG. 2 shows a side view of the handheld clamp device of FIG. 1, with an embodiments of a golf ball lacking dimples located in one embodiment of a golf ball receiving unit and the movement of the second lever arm 103 and pivot 104 as indicated by the arrows.
Figure 8:
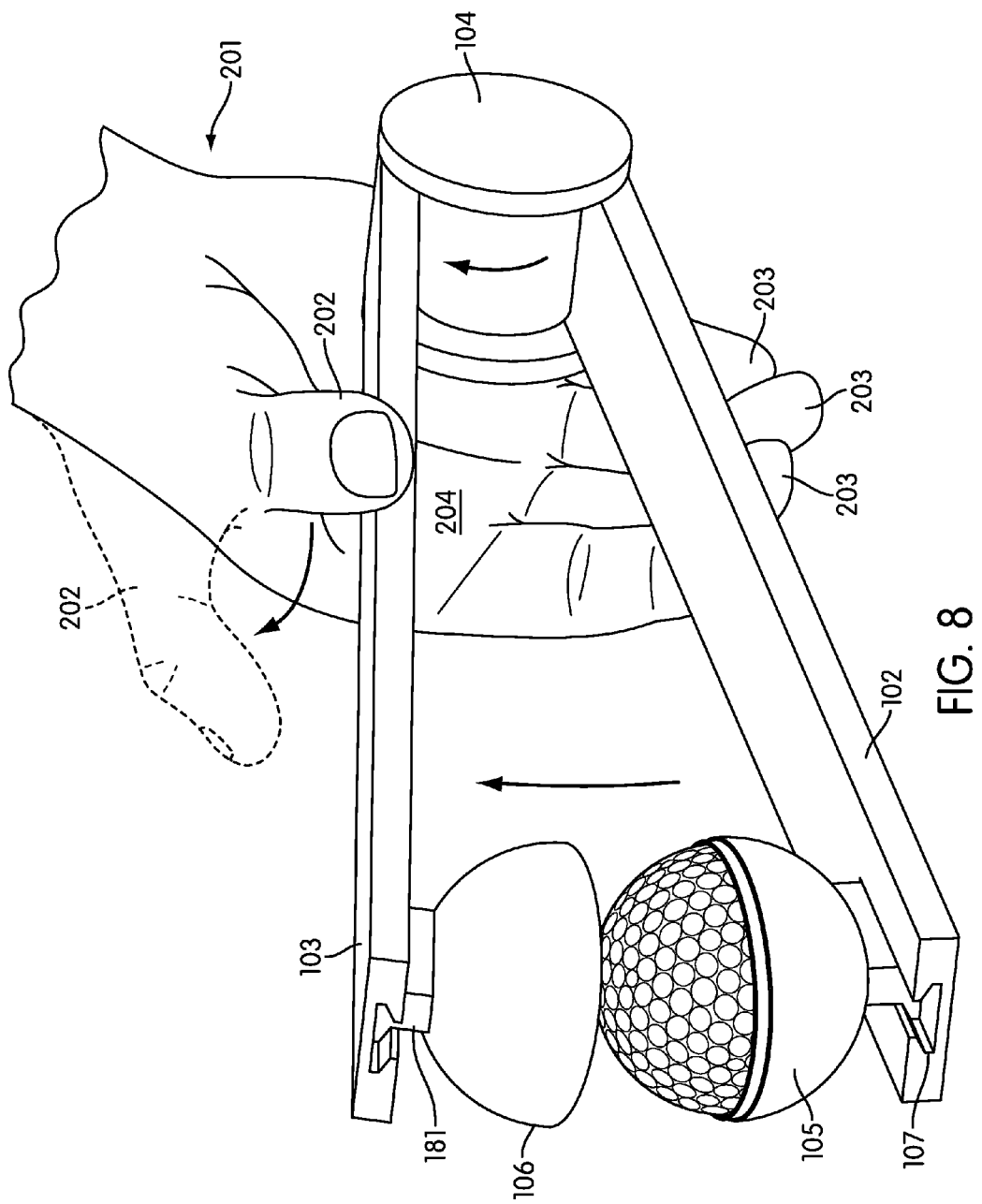
FIG. 8 shows the handheld clamp device in use being held by a person's hand.

The first lever arm 102 and the second lever arm 103 can generally be any structure capable of attaching to the golf ball receiving units 105 and 106, being attached to the pivot 104, and acting as levers. The first lever arm 102 and the second lever arm 103 can generally be of a shape and size so as to fit into the palm 204 of a human hand 201, and be grasped by the fingers 203 and thumb 202 as shown in FIG. 8. In certain embodiments, as shown in FIGS. 1, 2, and 8, the lever arms are long and narrow. Each of the first lever arm 102 and the second lever arm 103 may be in the form of a rectangular box, i.e., a rectangular parallelepiped or cubiod, or may have rounded edges such as a generally cylindrical shape.

The pivot 104 may be any mechanism or structure that will act as a fulcrum for both the first lever arm 102 and the second lever arm 103. Generally, the two lever arms and the pivot act as two class 3 levers. Each lever arm and the pivot act as a class 3 lever in that the distal end of each lever arm moves a greater distance than a midpoint of that lever arm. In other embodiments, the relative position of the pivot 104 to the force input location and the golf ball receiving units may be altered so that the device is a class 1 or class 2 lever mechanism.

In one embodiment, the pivot may rotate about an axis such that the two lever arms can be moved towards and away from each other about this axis. A rotatable pivot is shown by the directional movement arrow on pivot 104 in FIG. 2. In such an embodiment, the pivot may be biased so as to hold the lever arms at a certain position about its rotation. A biasing mechanism, such as a spring coil 120, may be contained in the pivot in order to achieve the bias. FIG. 8 shows such a bias in action during use of the device. As shown in FIG. 8, a human hand 201 can hold the lever arms at a certain position. When the human thumb 202 is removed, the biasing mechanism 120 will cause the arms to move to a biased position (for example, away from each other), as shown by the directional arrows.

In another embodiment, the pivot is a fixed immovable structure. In this embodiment, the first lever arm 102 and the second lever arm 103 may be flexible so as to bend in response to a force applied by a human hand.

Each of the first golf ball receiving unit 105 and the second golf ball receiving unit 106 may generally be of any structure that is configured so as to contain, or partially contain, a golf ball.

Figure 14:
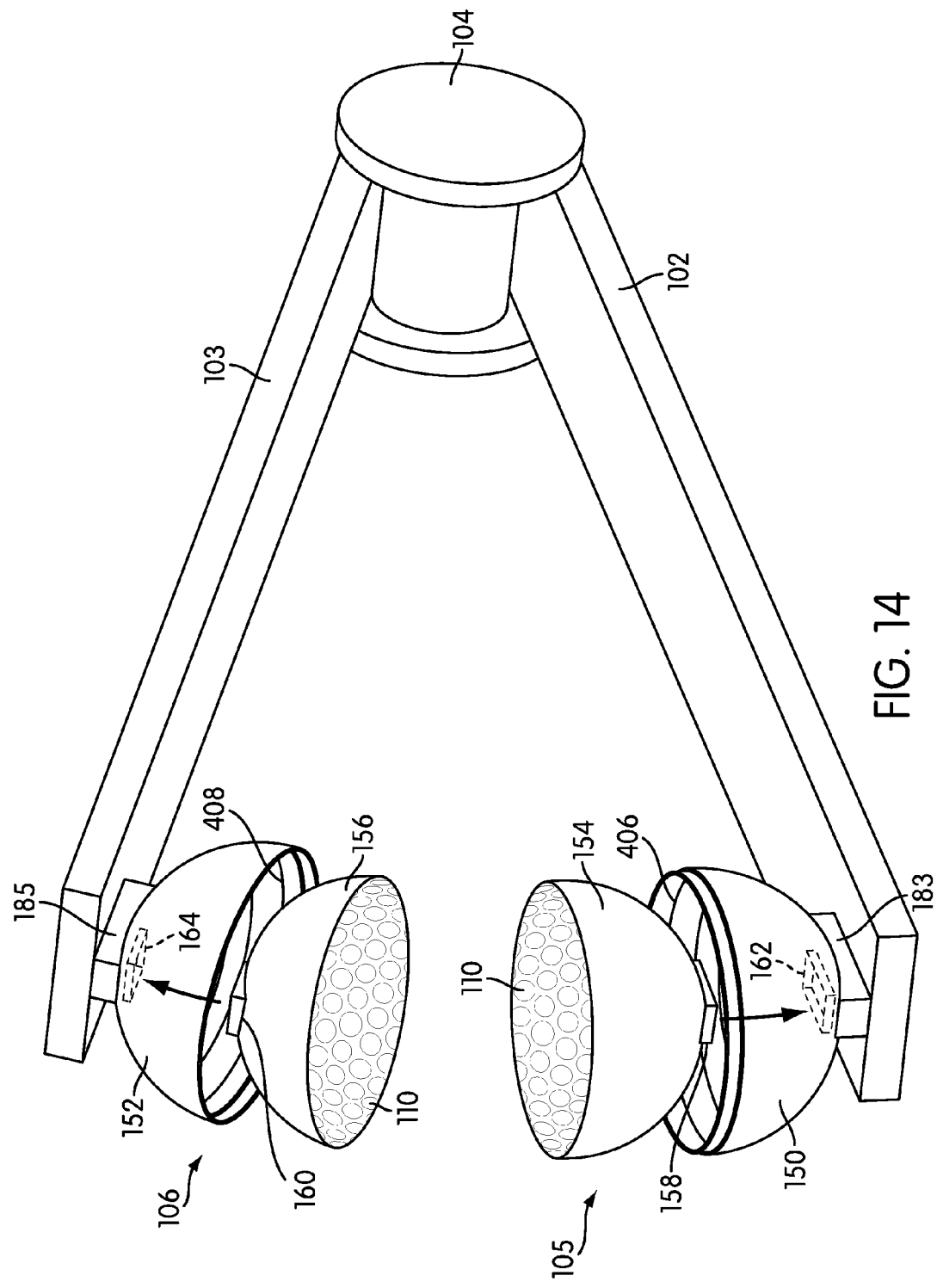
FIG. 14 shows another embodiment of the golf ball receiving units.

In some embodiments, each golf ball receiving unit can be made up of an external housing and an internal heating surface. For example, FIG. 14 shows how first golf ball receiving unit 105 can be made up of first external housing 150 and first internal heating surface 154, and second golf ball receiving unit 106 can be made up of second external housing 152 and second internal heating surface 156. As shown in FIG. 14, each of first the internal heating surface 154 and the second internal heating surface 156 may be a separate plate, which can be attached to and removed from the external housing. For example, the first internal heating surface 154 may include a first attachment mechanism 158 that couples with a corresponding part 162 on the first external housing 150, just as the second internal heating surface 156 can include a second attachment mechanism 160 that couples with a corresponding part 164 on the second external housing 152. However, in other embodiments each golf ball receiving unit can be a continuous one-piece construct, such that the internal heating surface is the inner surface of the external housing part or fixedly attached to the external housing part.

Each of the first external housing 150 and the second external housing 152 for each golf ball receiving unit may generally have any external shape. The external shape may be in the form of a hemisphere, as shown in FIGS. 1-19, for example. In particular embodiments, the external shapes of the two external housings are two matching hemispheres. Alternatively, the external shapes of the two external housings may be a box or any other shape as desired.

Figure 3:
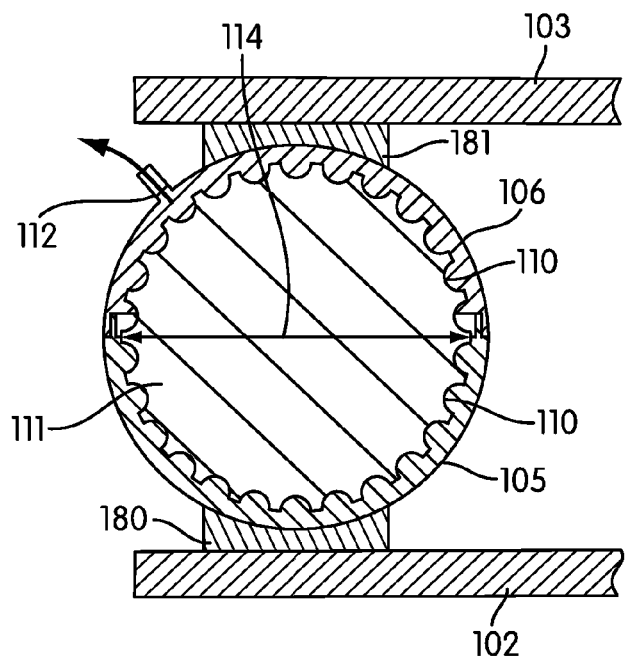
FIG. 3 shows a sectional side-view of the two golf ball receiving units surrounding a golf ball.

Each internal heating surface has a shape that may generally be spherical or hemispherical. The shape of first internal heating surface 154 and the shape of the second internal heating surface 156 may be in the form of matching halves of a sphere that has been bisected by a two dimensional plane. FIGS. 1-4 and 14 show such an embodiment; in particular FIG. 3 shows a side view of the hemispherical portions of golf ball receiving units 105 and 106 enclosed around a generally spherical golf ball 111. Alternatively, the shape of first internal heating surface and the shape of the second internal heating surface may be matching interlocking irregular hemispheres, having edges that do not fall on a two dimensional plane.

Each of the first golf ball receiving unit 105 and the second golf ball receiving unit 106 has an internal diameter 114, as shown in FIG. 3. The internal diameter can be the same or nearly the same as the diameter of a golf ball. According to United States Golf Association (USGA) regulations, the usual standard size of a regulation play golf ball is 1.680 or 1.720 inches. Therefore, in certain embodiments, the internal diameter 114 of each golf ball receiving unit may be 1.680 inches or 1.720 inches. However, the United States Golf Association regulations do not mandate a maximum diameter, and so the golf ball receiving units may have any internal diameter that corresponds to the diameter of a golf ball. Additionally, the diameter 114 may be configured for non-regulation play, such that the diameter 114 may have any value regardless of the USGA regulations.

In certain embodiments, one or both of the first internal heating surface 154 and the second internal heating surface 156 may have a pattern therein. When in use, device 101 may impart this pattern to the surface of a golf ball by heating the golf ball to a predetermined temperature and embossing the pattern into the surface of the golf ball. The pattern can generally be any type of pattern. For example, the pattern may be a functional pattern that affects how the golf ball plays during a round of golf, or the pattern may be a cosmetic pattern that only changes the appearance of the surface of the golf ball. In particular embodiments, the pattern may be a dimple pattern. FIGS. 1, 3-7 and 14 show a representative dimple pattern 110. Generally, as in known in the art, a "reverse" dimple pattern is the inverse of a desired dimple pattern, such that each location where a dimple indent is to be formed on a golf ball contains a raised bump corresponding to that dimple. A "reverse" dimple pattern is therefore a type of dimple pattern, and the dimple pattern 110 may be understood as any type of pattern that results in the golf ball having corresponding dimples.

Figure 5:
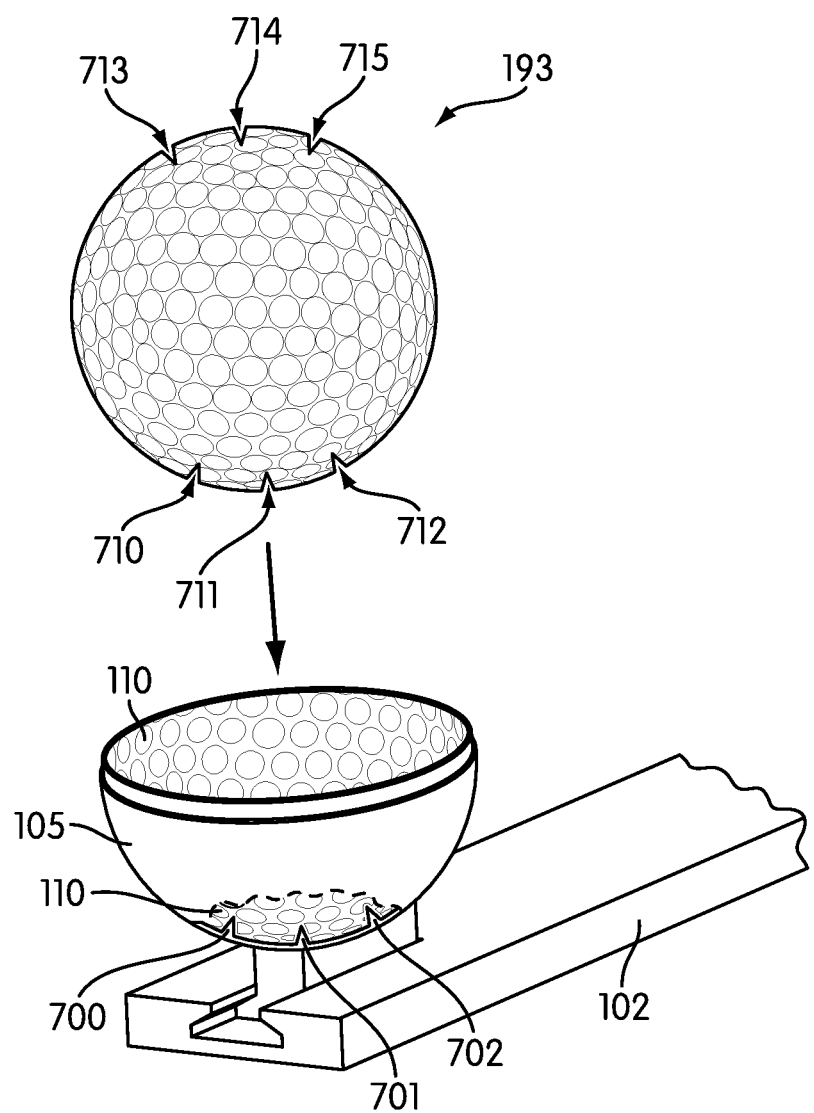
FIG. 5 shows a golf ball receiving unit with several pins used to orient an associated golf ball in the golf ball receiving unit.
Figure 6:
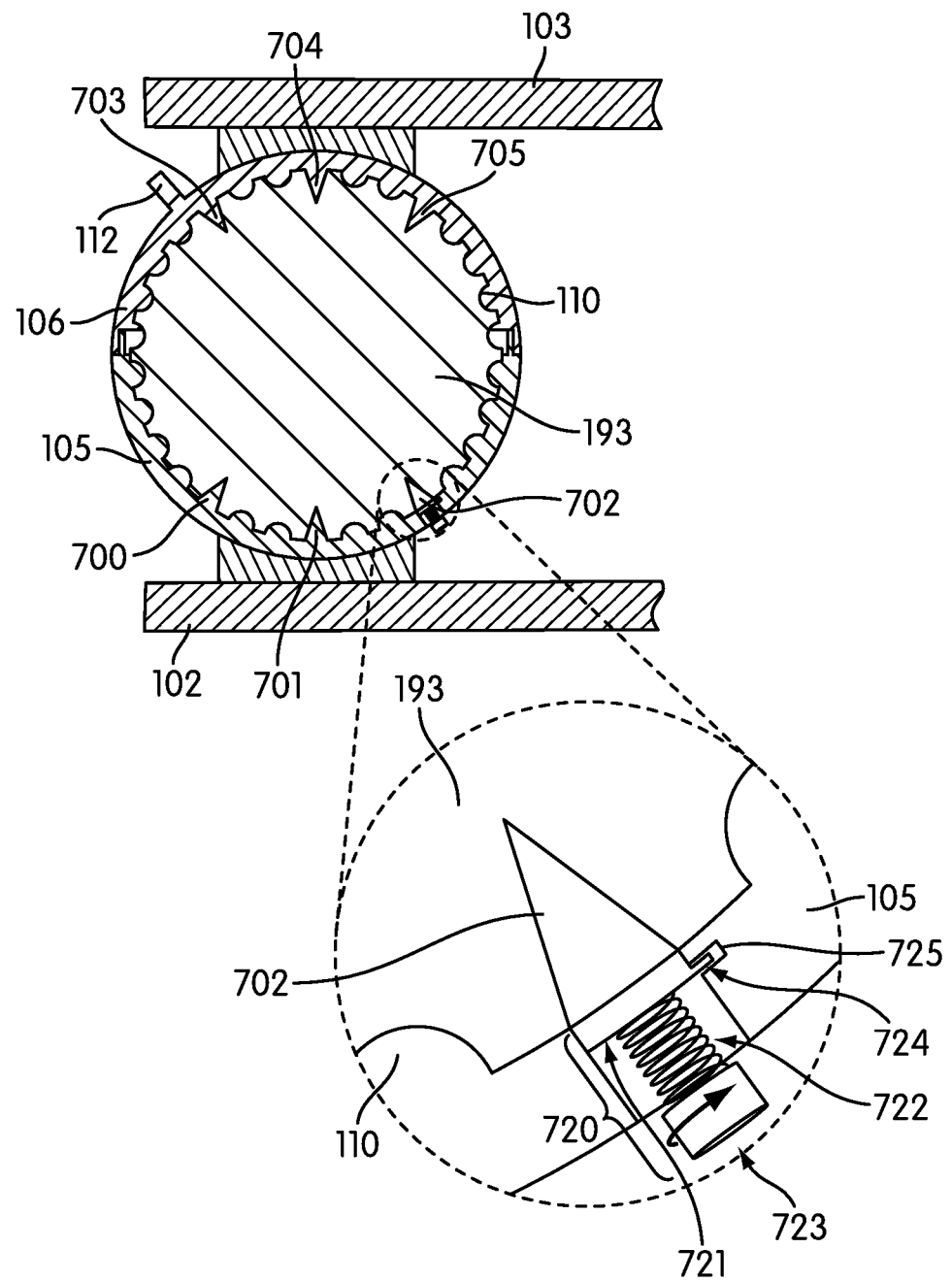
FIG. 6 shows a sectional side-view of the two golf ball receiving units surround a golf ball, where the golf ball is oriented by several pins. One of the pins is shown to be retractable.
Figure 7:
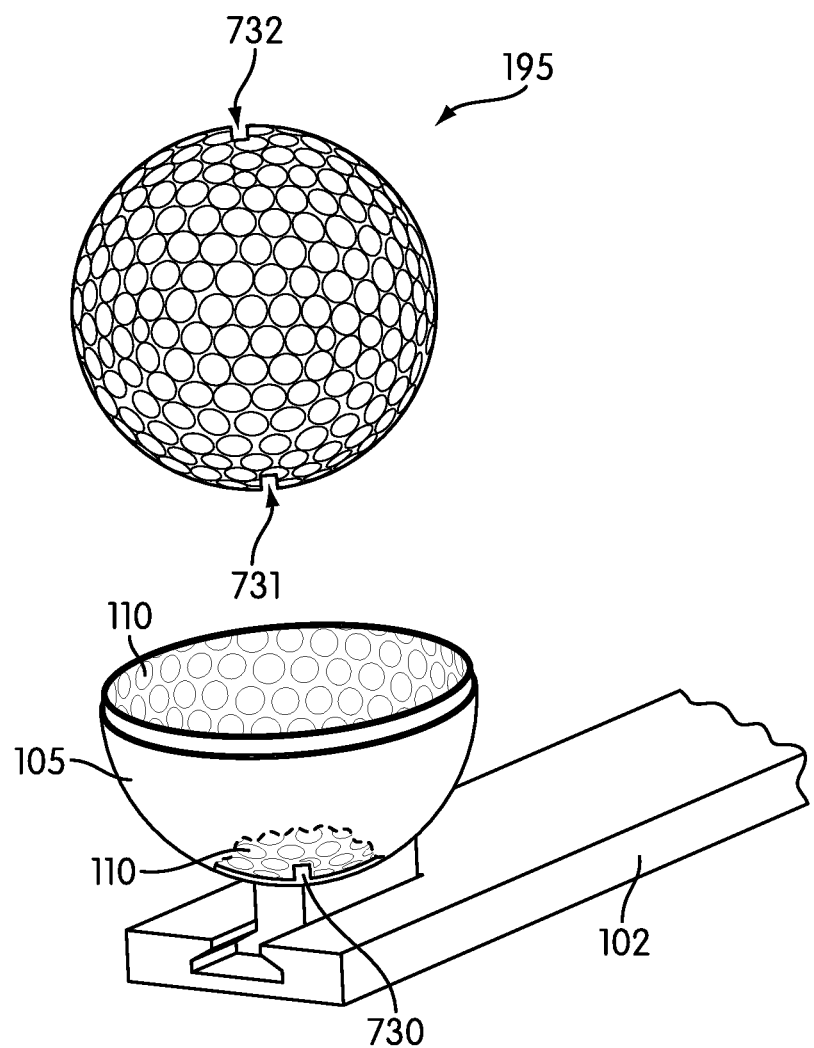
FIG. 7 shows a golf ball receiving unit with a non-standard dimple that can be used to orient the associated golf ball in the golf ball receiving unit.

The golf ball receiving units may contain at least one structure that causes the golf ball to be oriented in a specific orientation when placed within the golf ball receiving units. FIGS. 5-7 show representative structures that can be used to orient the golf ball. For example, FIG. 5 shows how several pins that may be used to orient a corresponding golf ball. Specifically, first golf ball receiving unit 105 may contain a first pin 700, a second pin 701, and a third pin 702. Although the pins are shown in FIGS. 5 and 6 as being triangular in cross-section, they may generally be configured in any long and thin structure. The pins extend from the internal heating surface inside the golf ball receiving unit. An associated golf ball 193 may then have at least one hole corresponding to the at least one pin. Specifically, golf ball 193 may have a first hole 710 corresponding to first pin 700, a second hole 701 corresponding to second pin 701, and a third hole 712 corresponding to third pin 702. As shown in FIG. 6, golf ball receiving unit 106 may also include one or more structures for orienting the golf ball. Namely, golf ball receiving unit 106 may include fourth pin 703, fifth pin 704, and sixth pin 705. The associated golf ball 193 therefore may also have fourth hole 713, fifth hole 714, and sixth hole 715. Although each golf ball receiving unit as shown in FIGS. 5 and 6 includes three structures for orienting the golf ball, any number of such structures may generally be present as may be required. For example, in some embodiments, each of the first golf ball receiving unit 105 and the second golf ball receiving unit 106 may include just one such structure, such as pin 701 and pin 704. These structures may be useful in, for example, applying a pattern to a golf ball that is not otherwise spherically symmetrical.

As is shown in FIG. 6, one or more of the structures for orienting the golf ball in the golf ball receiving units may be retractable. Specifically, FIG. 6 shows how pin 702 may be retractable into the body of the first golf ball receiving unit 105. A representative retraction mechanism 720 is shown in the zoomed-in portion of FIG. 6. This representative retraction mechanism 720 includes: a platform 721 that holds pin 702 thereon, a spring 722 for biasing the retraction mechanism, and a control mechanism 723 for engaging a latch 724 into a latch receiving structure 725. On account of the retraction mechanism 720, the retractable pin 702 may therefore be used only as desired.

FIG. 7 shows another embodiment of a structure that causes the golf ball to be oriented in a specific orientation when placed within the golf ball receiving units. In this embodiment, the structure 730 is a non-regularly shaped dimple that is otherwise part of a dimple pattern 110. The non-regularly shaped dimple 730 may correspond to a non-regularly shaped dimple 731 on a golf ball 195. Golf ball 195 may also have a second non-regularly shaped dimple 732 corresponding to a second non-regularly shaped dimple in the second golf ball receiving unit 106 (not shown in FIG. 7). Such a non-regularly shaped dimple structure may be useful in orienting a golf ball having an existing dimple pattern thereon, in order to (for example) use the golf ball heating device of the present disclosure to repair an existing dimple pattern after repeated use.

The golf ball receiving units may be attached to the lever arms by any known attachment mechanism. For example, the first golf ball receiving unit 105 may be removably attached to the first lever arm 102 by a first attachment mechanism 180, just as the second golf ball receiving 106 unit may be removably attached to the second lever arm 103 by a second attachment mechanism 181.

Figure 9:
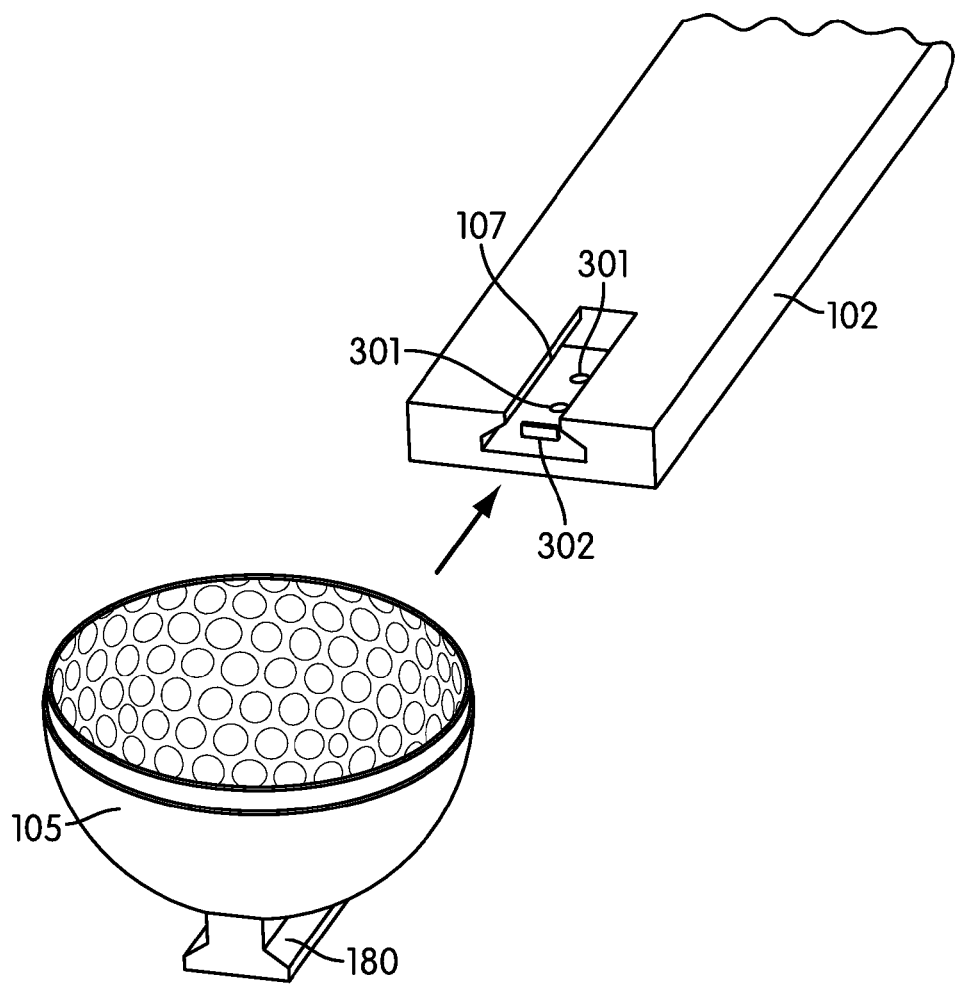
FIG. 9 shows an embodiment of a first attachment mechanism for attaching an embodiment of a golf ball receiving unit to a lever arm.

As shown in FIGS. 1, 4, 5 and 9, one embodiment of the first attachment mechanism 180 may be a tongue and groove type mechanism. In such embodiments, the first lever arm 102 may be provided with a first groove 107 and the second lever arm 103 may be provided with a second groove 109. A tongue attachment mechanism, such as first tongue 180 or second tongue 181, that is a part of the golf ball receiving unit can be fitted into the first groove or the second groove, such as by sliding the first tongue 180 into the first groove 107. The tongues and grooves may generally take any shape that keeps the components securely attached. FIG. 9 shows a detailed view of this embodiment, whereby attachment mechanism 180 can be slid into first groove 107. The attachment mechanism 180 can be kept in place by a tab 302, or other mechanism/geometry that secures the attachment mechanism 180. The tab 302 can be moveable by a user. Accordingly, a user can attach the golf ball receiving unit 105 to the lever arm 102, as well as remove the golf ball receiving unit 105 from the lever arm 102, as desired.

Figure 10:
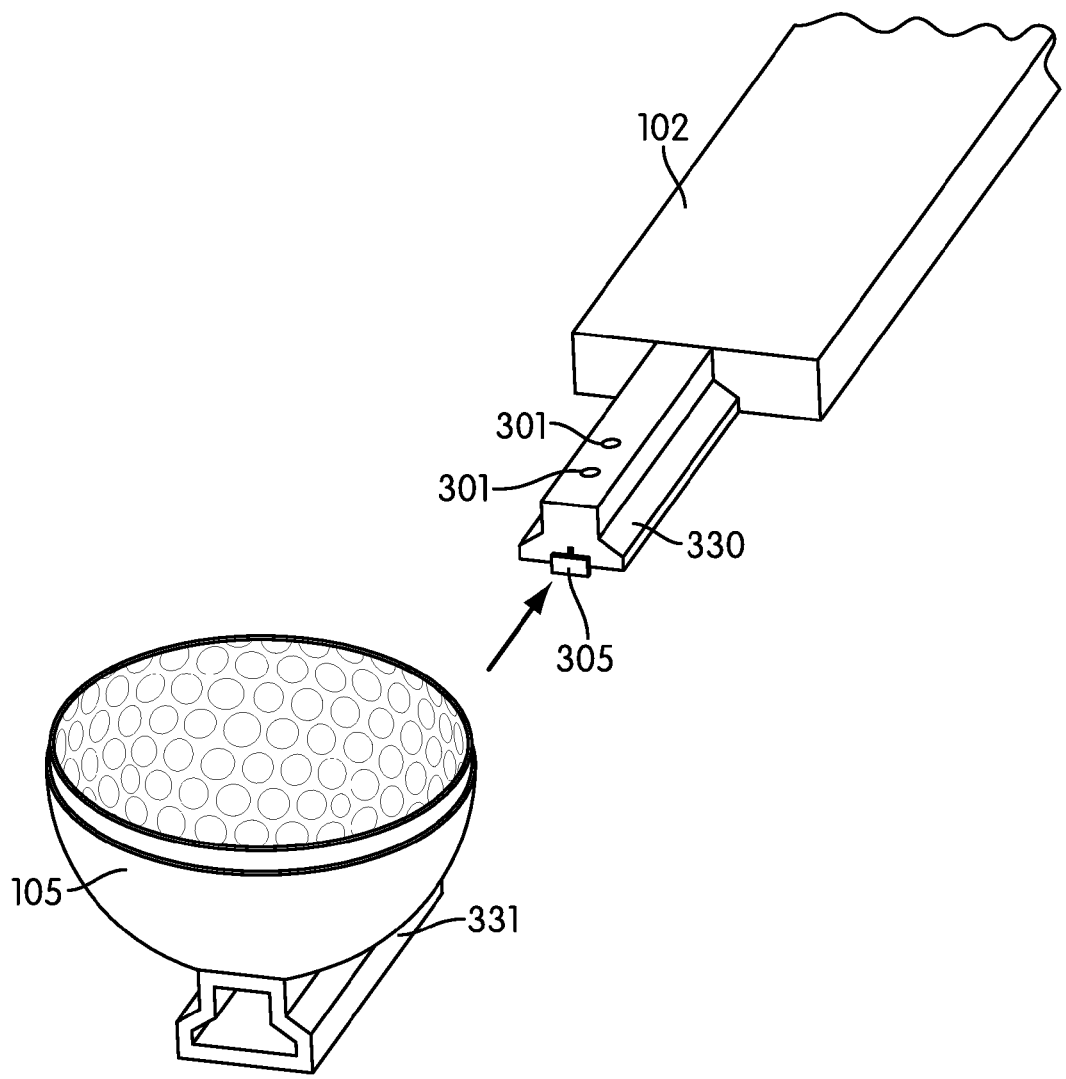
FIG. 10 shows an embodiment of a second attachment mechanism for attaching an embodiment of a golf ball receiving unit to a lever arm.

FIG. 10 shows an alternative embodiment of a removable attachment mechanism 330 and 331. As shown in FIG. 10, the alternative attachment mechanism 330 and 331 can be a male/female interlocking system. Male portion 330 can be disposed on the lever arm 102, while female portion 331 can be disposed on the golf ball receiving unit 105. Alternatively, the positions of the male and female portions may be reversed. Tab 305 can secure the male and female interlocking portions in place, so as to removably attach the golf ball receiving unit 105 on the lever arm 102. A variety of other embodiments of the removable attachment mechanism are contemplated to be within the scope of the present disclosure, as are generally known in the mechanical arts.

Alternatively, the first golf ball receiving unit 105 and the second golf ball receiving unit 106 may be attached to the first lever arm 102 and the second lever arm 103 (respectively) in a manner such that they are not removable from the first lever arm 102 or the second lever arm 103. In such embodiments, the first golf ball receiving unit 105 and the second golf ball receiving unit 106 may be permanently secured to the first lever arm 102 and the second lever arm 103, respectively. FIG. 14 shows such an embodiment, where first non-removable attachment mechanism 183 connects the first golf ball receiving unit 105 to the first lever arm 102, and second non-removable attachment mechanism 185 connects the second golf ball receiving unit 106 to the second lever arm 103. Such non-removable attachment mechanisms may generally be of any structure, such as fasteners, screws, bolts, welding, adhering, etc. Furthermore, each golf ball receiving unit may be directly attached to each lever arm, such that no separate component of the device comes between them.

Figure 11:
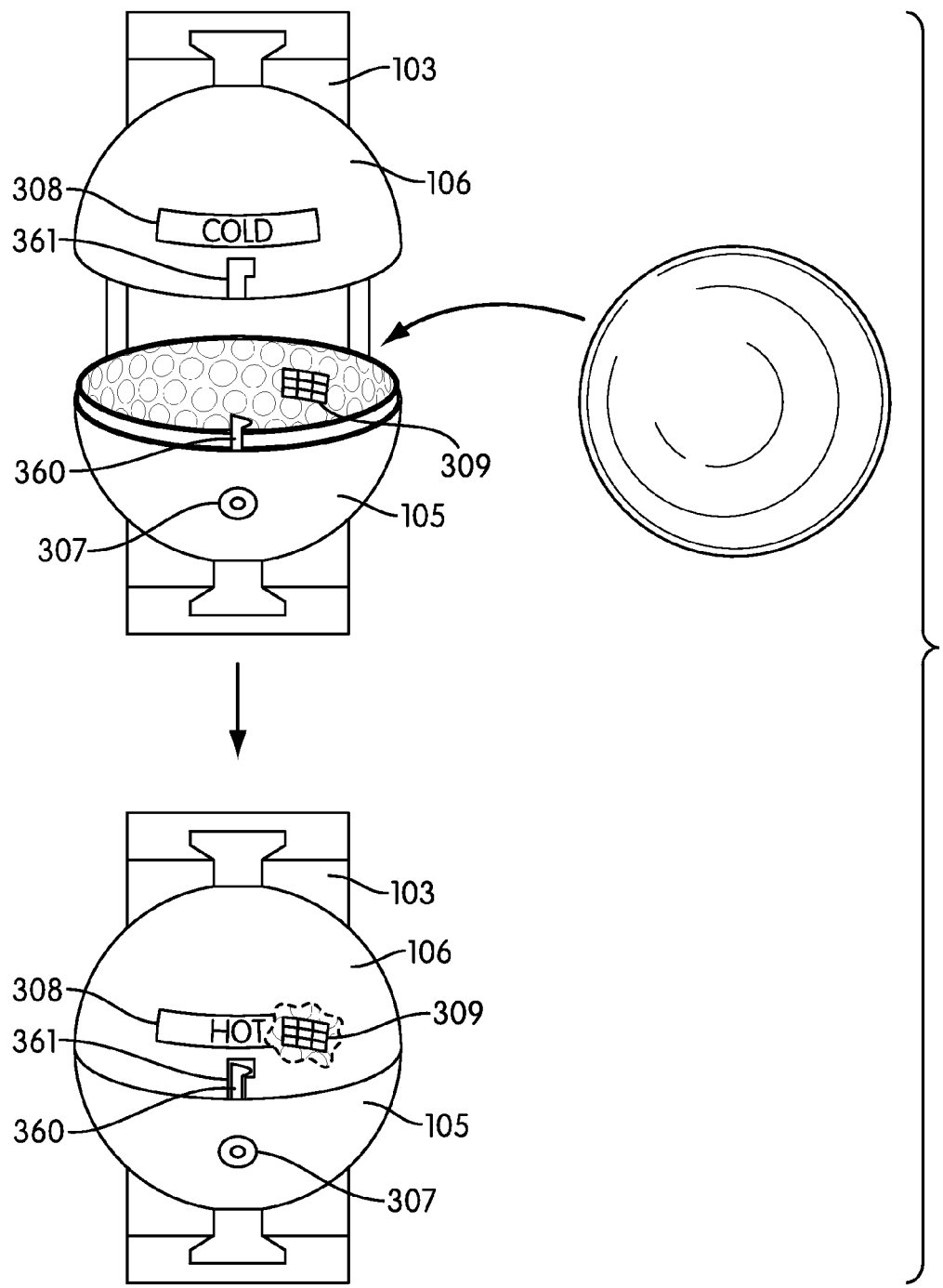
FIG. 11 shows a top-down view of an embodiment of a set of golf ball receiving units before and during use.

Further features that may be incorporated into the handheld clamp device are shown in FIG. 11. Specifically, the device 101 may include a latch mechanism 360 and 361 that keeps the first golf ball receiving unit 105 and the second golf ball receiving unit 106 in closed contact with each other when the latch mechanism 360 and 361 is engaged. The latch mechanism 360 and 361 may be made up of a first latch part 360 on the first golf ball receiving unit 105 and a second latch part 361 on the second golf ball receiving unit 106. The two parts may temporarily engage in order to hold the first golf ball receiving unit 105 and the second golf ball receiving unit 106 together, as shown in the lower portion of FIG. 11. The latch mechanism 360 and 361 may generally be of any structure that is capable of temporarily holding the first golf ball receiving unit 105 and the second golf ball receiving unit 106 together, and may comprise physically interlocking structures, electronic systems such as a pair of electromagnets, or the like.

Figure 12:
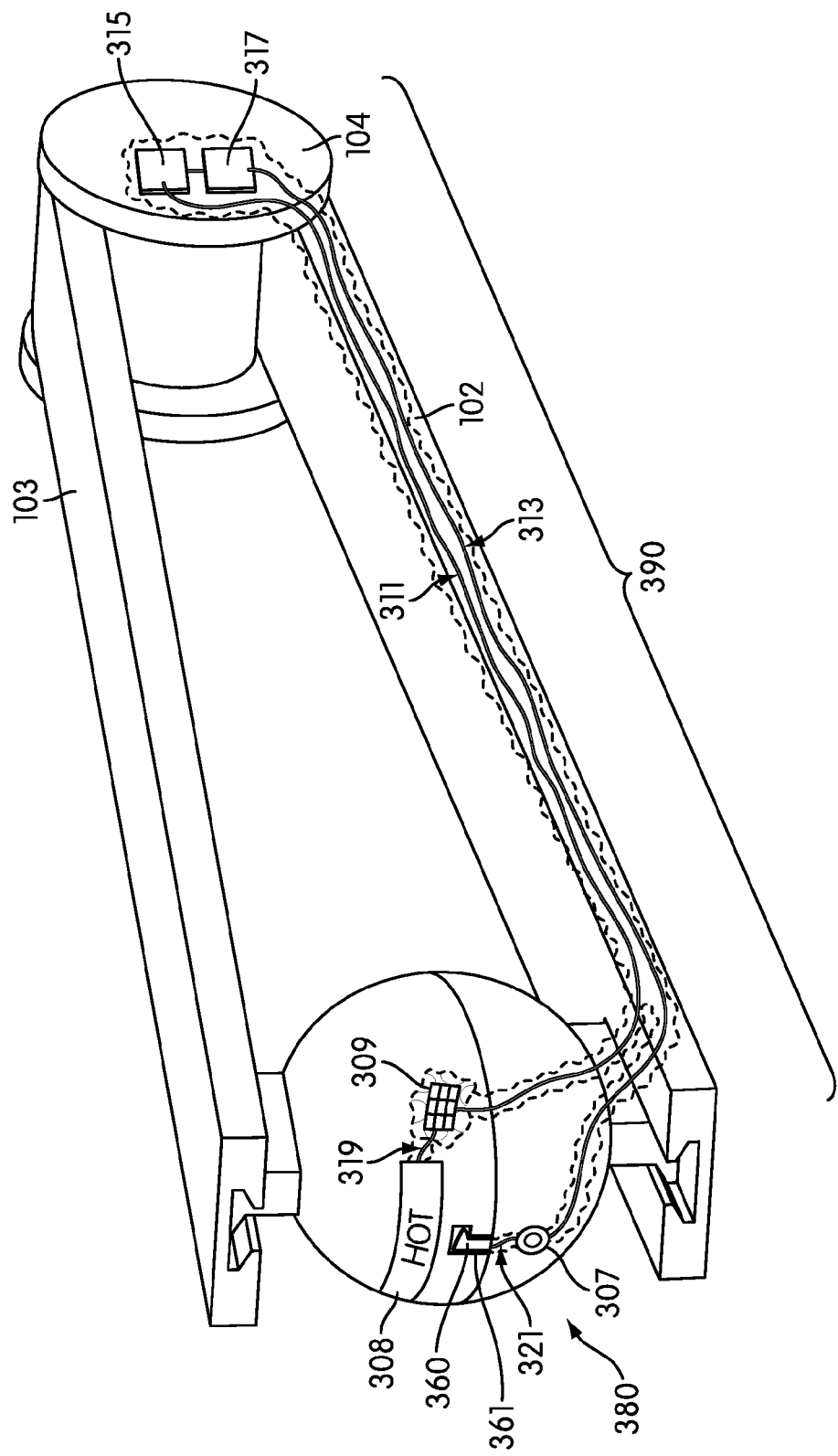
FIG. 12 shows an embodiment of a control system for automatic, or manual, control of the opening of the golf ball receiving units after use.

The latch mechanism 360 and 361 may further be connected to one or more release mechanisms, such as a manual release mechanism 380 or an automatic release mechanism 390, as shown in FIGS. 11 and 12. In a first aspect, device 101 may include a manual release mechanism 380 that releases the latch mechanism upon a user initiated input. As shown in FIGS. 11 and 12, the manual release mechanism 380 may include a button 307 located on the first golf ball receiving unit 105 that is connected to the latch mechanism 360 and 361 by connector 321. The connector 321 may be an electronic wire or a physical connection. A user may therefore push the manual release button 307 in order to release the latch mechanism 360 and 361 when desired. However, the manual release mechanism 380 can take forms other than a button and can be located on any other portion of device, so long as the manual release mechanism 380 releases the latch mechanism 360 and 361 upon a user input.

In another aspect, device 101 may include an automatic release mechanism 390. The automatic release mechanism 390 may be made up of a temperature sensor 309, a controller 315, and a trigger 317. In operation, first the temperature sensor 309 can sense a temperature in or about a golf ball receiving unit 105. Then the temperature sensor 309 may send an input based on the temperature to the controller 315. The controller 315 may be programmed to compare this input to a predetermined temperature threshold value, such as a temperature that is low enough so that the golf ball 111 has sufficiently cooled. When the input is found to be less than or equal to the predetermined temperature threshold value according to the programming, the controller 315 may send a signal to the trigger 317. The trigger 317 may then cause the latch mechanism to release, so that a golf ball contained within the first golf ball receiving unit 105 and the second golf ball receiving unit 106 can be removed by a user. Accordingly, the automatic release system 390 keeps the golf ball receiving units closed until the heating process is completed.

The various parts of the automatic release system 390 are shown in FIG. 12 as being connected by several wires. Specifically, the temperature sensor 309 is connected to the controller 315 by electronic wire 311, and the trigger 317 is connected to the latch mechanism 360 and 360 via the manual release button 307 through electronic wire 313 and connector 321, in which case the connector 321 may be an electronic wire. These wires may contain any intermediate connections (not shown), so as to enable the first golf ball receiving unit 105 and the second golf ball receiving unit 106 to be removed from device 101, as necessary. Additionally, each connection and wire may transmit a signal in either direction, to or from a specific part, as may be desired.

As shown in FIG. 12, the controller 315 and trigger 317 may be located in the pivot 104. Alternatively, the controller 315 and trigger 317 may be located at any other location in device 101, so long as they are appropriately connected to the latch mechanism 360 and 361 and temperature sensor 309.

Figure 13:
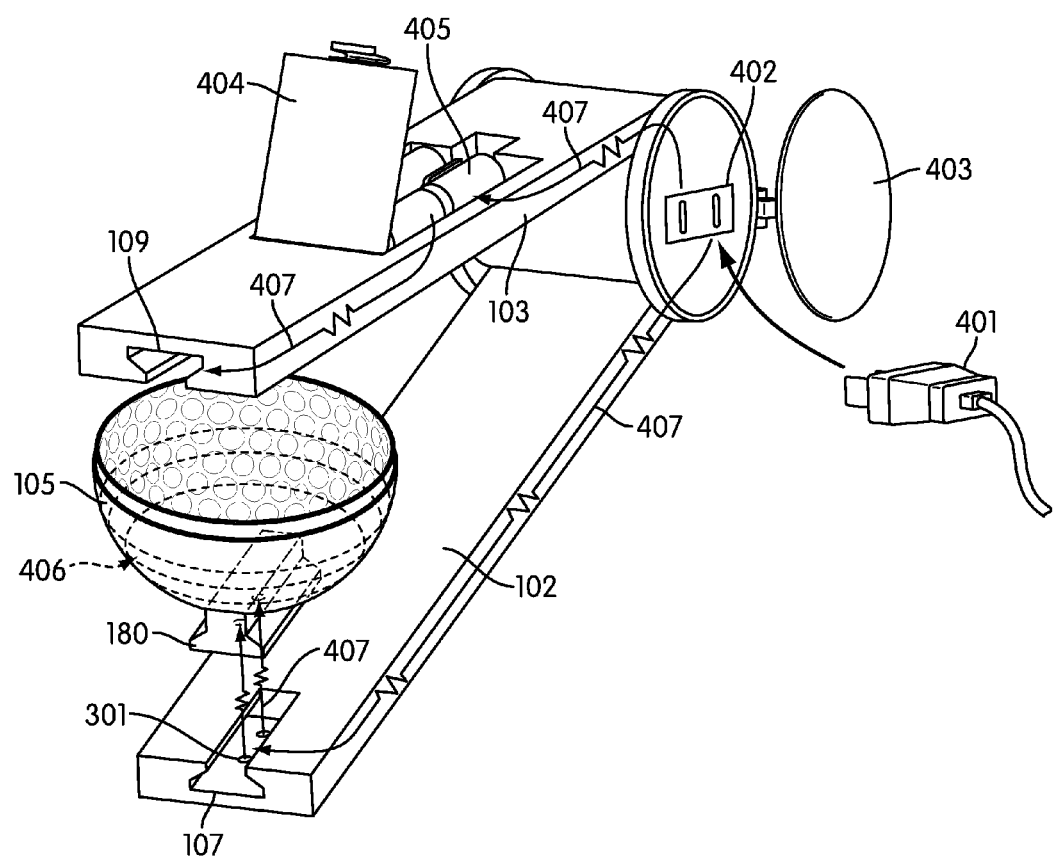
FIG. 13 shows an embodiment of an electrical system in the handheld clamp device.

Furthermore, the controller 315 and associated components may also control the heating element 406. A representative heating element 406 is shown in FIGS. 13 and 14. For example, the controller 315 may receive a signal from the latch mechanism 360 and 361 that the first golf ball receiving unit 105 and the second golf ball receiving unit 106 have closed, at which time the controller 315 may send a signal to the trigger 317. The trigger 317 may then cause the heating element 406 to start a heating sequence. The heating sequence may be monitored by the temperature sensor 309 in a feedback loop with the controller 315 and trigger 317. Finally, the controller 315 may signal the trigger 317 to end the heating sequence upon, for example, expiration of a predetermined time period or upon achieving a predetermined temperature. In this way, device 101 can be used to apply heat to a golf ball in a controlled manner.

In conjunction with the temperature sensor 309, a golf ball receiving unit 106 may also have a temperature display 308 thereon. Either or both of first golf ball receiving unit 105 and second golf ball receiving unit 106 may have a temperature display 308 thereon. As shown in FIG. 11, the temperature display 308 may be a visual display that indicates the temperature of the golf ball receiving unit 106 to a user according to data from the temperature sensor 309. The temperature sensor 309 may be connected to the temperature display 308 by electronic wire 319. The temperature display 308 may display this information in an qualitative manner, for example displaying either "Hot" or "Cold" as shown in FIG. 11. Alternatively, the temperature display 308 may display the temperature information in a quantitative manner, such as by displaying the temperature in degrees Fahrenheit or Celsius, or units Kelvin.

Device 101 may include an electrical system, as generally shown in FIG. 13. The electrical system is intended to supply electricity to the heating elements, when the heating element is an electrical heating element. The electrical system may include at least one battery 405. The battery or batteries 405 may be located in a compartment in either of the first lever arm 102 or the second lever arm 103, covered by casing 404, as shown in FIG. 13. Alternatively, the batteries 405 may be located in any other location in the device 101, such as in the pivot 104. The batteries 405 may generally be any type of battery, such as alkaline, nickel-metal hydride, or lithium ion. In some embodiments, the batteries are rechargeable.

The electrical system may also include a port 402 for connecting an external source of electrical. FIG. 13 shows this port 402 as a two-prong "Type A" electrical socket for connecting to a two-prong plug 401 that supplies electricity. However, the port 402 may be any type of electrical socket, such as a three-prong "Type B" socket. The configuration of the socket may generally be of any design, such as U.S.

standard sockets, Japanese standard sockets, or European Union standard sockets. In other embodiments, the port 402 may be, for example, a powered USB port or an AC adapter port. The port 402 can be covered by a cover 403, so as to prevent contamination of the port 402 during use or storage of the device.

The external source of electricity 401 may be used to charge the batteries 405, or to operate the device without use of the batteries 405. Accordingly, in some embodiments, a user may use the device 101 either while it is plugged in or without connecting it to an external source of electricity. The device 101 may further include an indicator light (not shown) to indicate whether the electrical system is on or off.

The various parts of the electrical system may be connected by electrical wires, in any configuration as is generally necessary to deliver electricity to the various components. Such wires will generally follow the path of electricity 407 as shown in FIG. 13. Electricity can be delivered to the heating element 406 in a golf ball receiving unit 105 through leads 301. The leads 301 allow the golf ball receiving unit 105 to be removable. However, other embodiments may use other connections or wire configurations depending on whether the first golf ball receiving unit 105 and/or the second golf ball receiving unit 106 are removable or permanently attached to the first lever arm 102 and the second lever arm 103, respectively.

Each of the first golf ball receiving unit 105 and the second golf ball receiving unit 106 contains a heating element. As shown in FIG. 14, the first golf ball receiving unit 105 contains a first heating element 406, and the second golf ball receiving unit 106 contains a second heating element 408. Each of the first heating element 406 and the second heating element 408 may generally be any type of heating element that delivers a controlled and even amount of heat to the internal heating surface of the first golf ball receiving unit 105 or the second golf ball receiving unit 106. Generally, each of the first heating element 406 and the second heating element 408 should enable the internal heating surface to achieve a desired temperature so as to heat the surface of the golf ball 111. In some embodiments, the temperature of the internal heating surface may be any temperature less than about 140° C. Specifically, in some embodiments, the temperature of the internal heating surface 154 or 156 may be between about 100° C. and about 140° C.

In one embodiment, as shown in FIGS. 13 and 14, heating element 406 may be made up of a wire that surrounds the internal heating surface 154. The heating element 406 may be an electrical heating element, such as a simple resistor or an induction heating system. As discussed above, the heating element 406 may be connected to the automatic release system, such that the controller can control the heating element.

Figure 4:
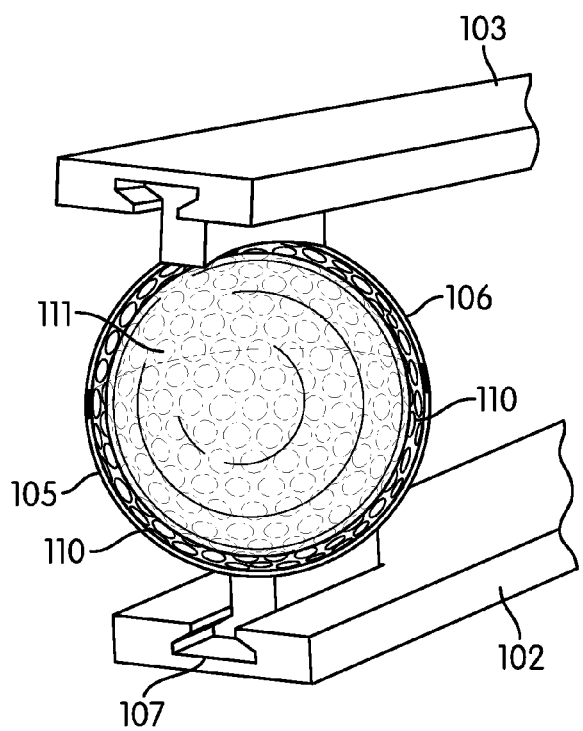
FIG. 4 shows a more detailed isometric view of the two golf ball receiving units around a golf ball.

When in use, the device 101 allows a user to apply heat to a golf ball 111 by placing the golf ball 111 into the golf ball receiving units 105 and 106. As shown in FIG. 1, a golf ball 111 is placed into the first golf ball receiving unit 105. FIG. 2 shows that a force is then applied to close the first golf ball receiving unit 105 and the second golf ball receiving unit 106 together around the golf ball 111. In embodiments where the internal heating surface of each golf ball receiving unit contains a pattern 110 thereon, the pattern 110 is imparted to the surface of the golf ball. This step is shown in FIGS. 3 and 4. Finally, FIG. 8 shows an embodiment where a biasing mechanism 120 in the pivot 104 forces the first golf ball receiving unit 105 and the second golf ball receiving unit 106 apart from each other when a user no longer applies the force keeping them together.

In some embodiments, the device 101 may be used as a ball warmer. In such embodiments, the internal heating surface of each golf ball receiving unit may have no pattern thereon, or a pattern that corresponds to an existing pattern on a golf ball 191. When the device 101 acts as a golf ball warmer, each of the first heating element 406 and the second heating element 408 generally causes each of the first internal heating surface 154 and the second internal heating surface 156 (respectively) to achieve a temperature of about room temperature, about 20° C. to about 25° C., or a temperature somewhat higher than room temperature, i.e., up to about 50° C. The device 101 may generally warm the ball 191 for a sufficient time so that the entirety of the golf ball 191 is at an equilibrium temperature.

Figure 16:
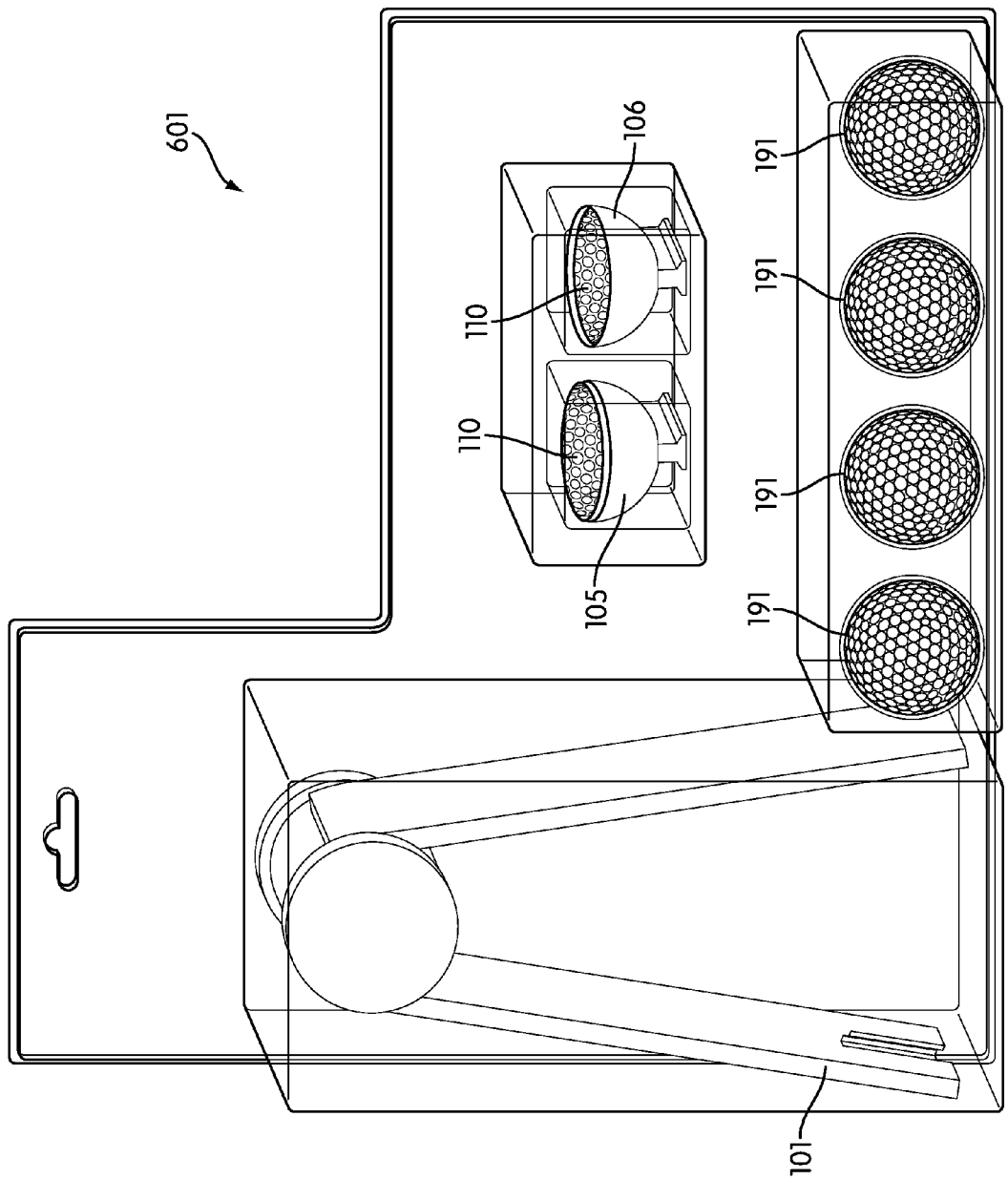
FIG. 16 shows an embodiment of a kit including the handheld clamp device, one pair of golf ball receiving units and several golf balls.

In other embodiments, the device 101 may allow a user to repair an existing pattern on a finished golf ball 191. FIG. 16 shows a kit 601 that may be used for this purpose. Kit 601 includes the handheld clamp device 101, a first golf ball receiving unit 105, a second golf ball receiving unit 106, and at least one finished golf ball 191. The finished golf ball 191 may have a dimple pattern already formed on the surface thereof. The golf ball 191 in kit 601 may have a cover layer that is capable of being embossed by the pattern 110 when the device heats the golf ball. Specifically, the golf ball cover layer should have a formulation which is be capable of being embossed at a temperature of less than about 140° C.

In this embodiment, the pattern 110 on the internal heating surfaces of the first golf ball receiving unit 105 and the second golf ball receiving unit 106 is a dimple pattern that corresponds to the existing dimple pattern on the finished golf ball 191. Therefore, the user may play several rounds of golf with the finished golf ball 191, until the surface of the finished golf ball 191 exhibits cracks and deformations. At this time, the user may then use the device 101 and associated first golf ball receiving unit 105 and second golf ball receiving unit 106 to impart the pattern 110 onto the finished golf ball 191, thereby restoring the dimple pattern 110 on the golf ball 191 to its original state.

Figure 17:
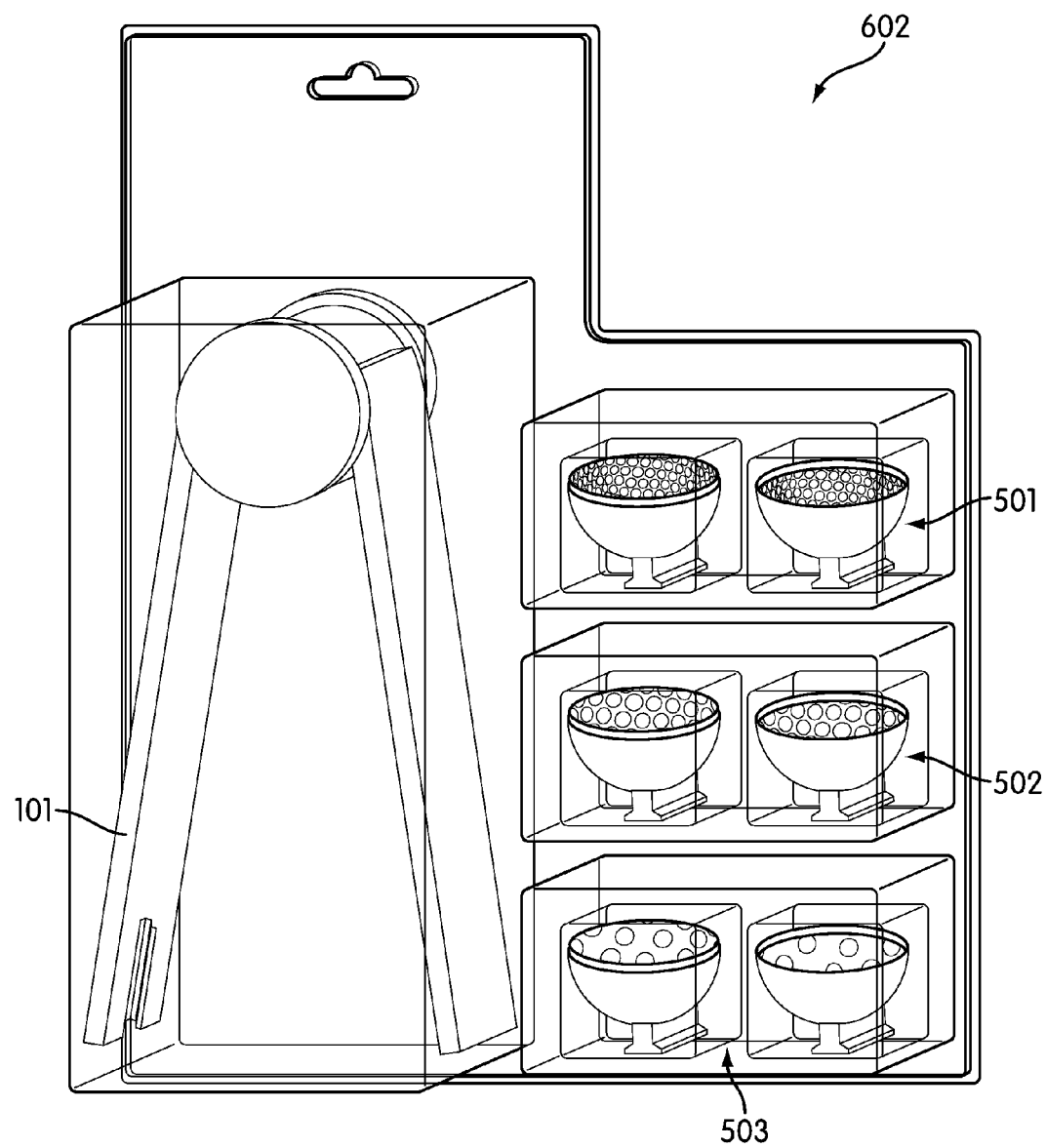
FIG. 17 shows an embodiment of a kit including the handheld clamp device and three different interchangeable pairs of golf ball receiving units.
Figure 18:
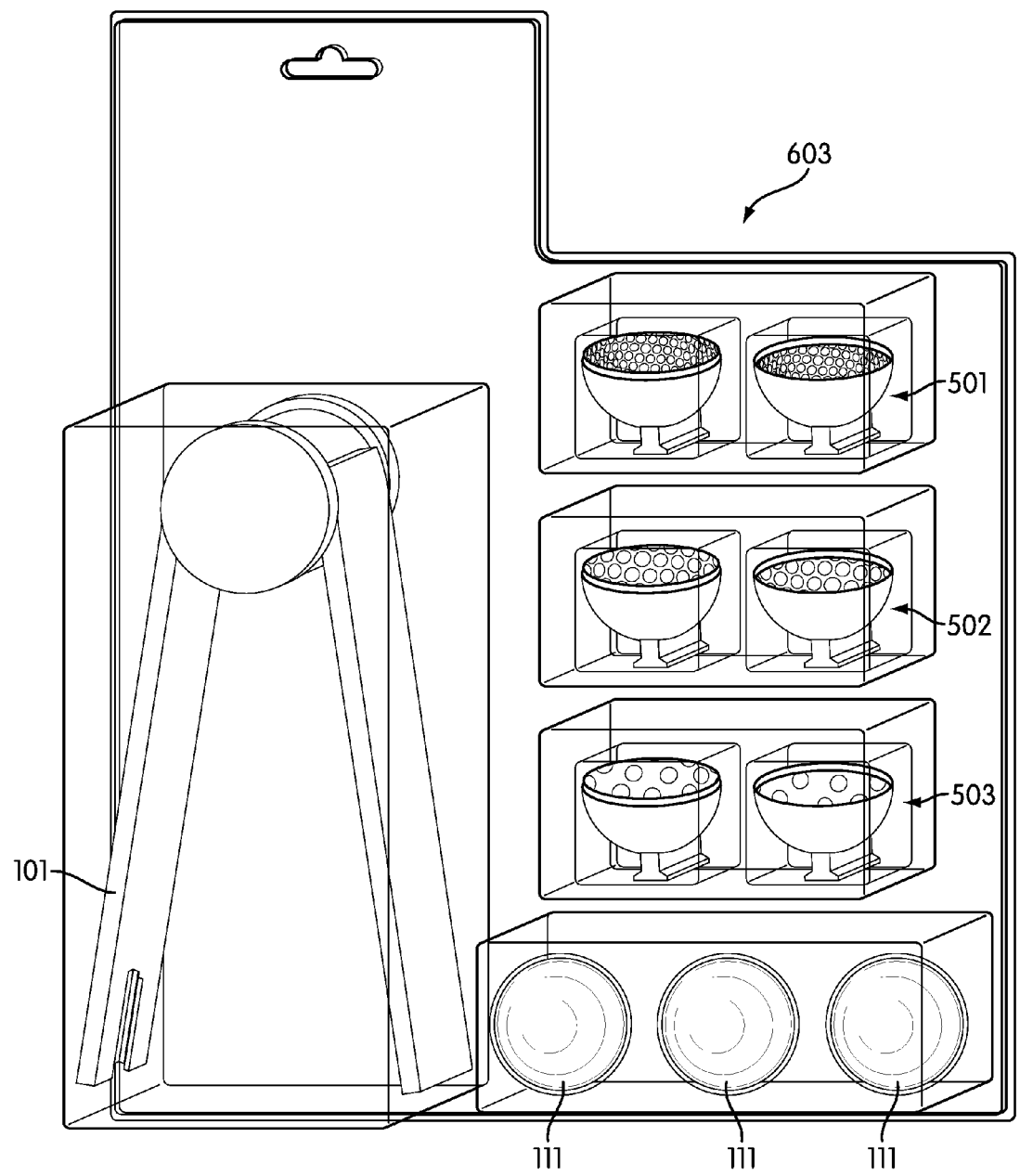
FIG. 18 shows an embodiment of a kit including the handheld clamp device, three different pairs of golf ball receiving units and golf balls.

In yet other embodiments, the device 101 may be used to impart various different patterns to a golf ball as desired by a user. FIGS. 17 and 18 show kits that may be used for this purpose. Kit 602 as shown in FIG. 17 contains the handheld clamp device 101, and a set 550 of three golf ball receiving unit pairs. In particular, kit 602 includes first golf ball receiving unit pair 501, second golf ball receiving unit pair 502, and third golf ball receiving unit pair 503. Kit 603 as shown in FIG. 18 is the same as kit 602, but further includes at least one finished golf ball 111 that does not have a dimple pattern thereon. Aside from the lack of dimples, the golf ball 111 may otherwise be the same as golf ball 191. Both the golf ball 111 and the golf ball 191 are finished golf balls, meaning that they include all material layers as are commonly used in regulation play golf balls, such as (for example) a cover layer, a coating layer and a top coat.

In embodiments such as those shown in FIGS. 17 and 18, the kits can comprise a set 550 of any number of golf ball receiving unit pairs. For example, the set 550 of golf ball receiving unit pairs can include one pair, two pairs, three pairs (as shown), four pairs, or more.

Figure 15:
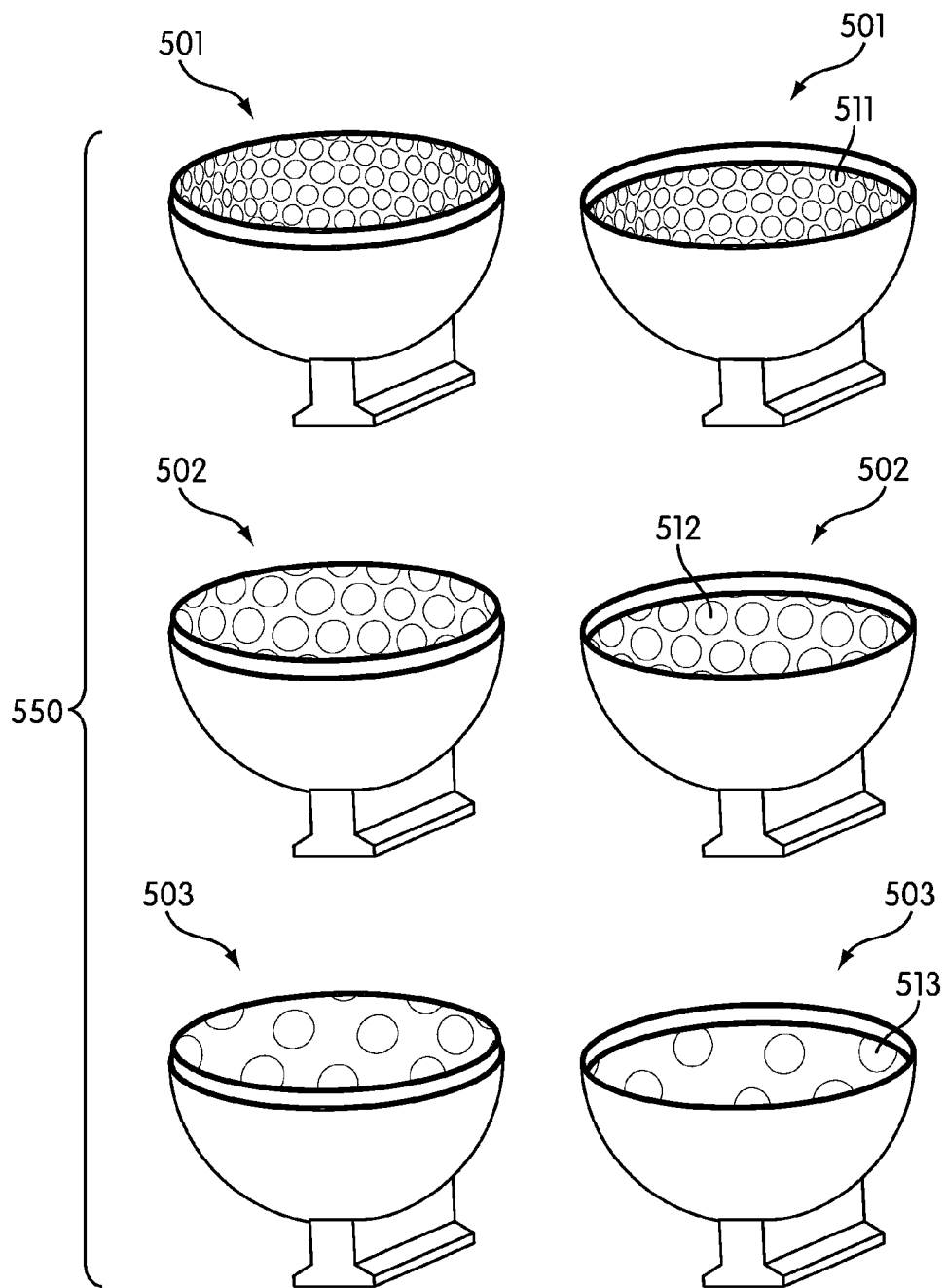
FIG. 15 shows three pairs of golf ball receiving units, each having different patterns disposed on an inner surface of the golf ball receiving units.

Each pair of golf ball receiving units in the set 550 may also have a different pattern on the internal heating surfaces thereof. FIG. 15 shows an example of such an embodiment, wherein first pair 501 has first pattern 511, second pair 502 has second pattern 512, and third pair 503 has third pattern 513. As shown in FIG. 15, each of the first pattern 511, the second pattern 512, and the third pattern 513 may be a different dimple pattern.

Each of the patterns on each pair of golf ball receiving units in the set 550 may exhibit a relationship among themselves so as to achieve a desired effect. In particular, the different patterns may correspond to different play characteristics of a golf ball. For example, the first pattern 511, second pattern 512, and third pattern 513 may correspond to different play characteristics of a golf ball.

For example, when the pattern in a pair of golf ball receiving units, such as pattern 511 in set 501, is a dimple pattern, the dimple pattern will have a total dimple volume corresponding to the sum total of all the volumes of each dimple. This total dimple volume, along with the diameter 114 of the pair of golf ball receiving units, will determine whether any excess material is removed through a drain 112 (as shown in FIG. 3), for a given size golf ball.

In some situations, a golfer may desire that no excess material is removed through the drain 112. However, the golfer may nonetheless desire to change the dimple pattern on a finished golf ball 111 or 191 using one or more of the several pairs of golf ball receiving units in the set 550. In such an embodiment, each of the several dimple patterns may have an equal total dimple volume. Such an embodiment can be achieved by, for example, varying the number, diameter and depth of the dimples in each pattern while keeping the total dimple volume constant. Methods and calculations for determining a total dimple volume are generally known in the art.

FIG. 15 shows such an embodiment, wherein the first pattern 511 is a dimple pattern with a large number of small sized dimples. Next, the second pattern 512 is a dimple pattern having a medium number of medium sized dimples. Finally, the third pattern 513 is a dimple pattern with a small number of large sized dimples. Each pair of golf ball receiving units 501, 502 and 503 otherwise has the same diameter 114. Accordingly, in this embodiment, the total dimple volume is the same in each of the first pattern 511, the second pattern 512, and the third pattern 513.

Therefore, a golfer may change the dimple pattern on a golf ball using any pair of golf ball receiving units 501, 502 or 503 in the set 550 without removing excess material. This embodiment might be used when, for example, a golfer desires to use one dimple pattern under, for example, certain weather conditions and another dimple pattern under different weather conditions. This may allow the golfer to apply a first dimple pattern to the golf ball during wet weather, while applying a second dimple pattern during dry weather. Thus, the different patterns may correspond to different play characteristics of a golf ball.

Each of the first kit 601, the second kit 602, and the third kit 603 is shown, and is discussed above, with respect to an embodiment of the device 101 wherein the golf ball receiving units are removable from the lever arms 102 and 103. However, in other embodiments, the device 101 in each kit may include permanently attached golf ball receiving units, whereby each permanently attached golf ball receiving unit comprises an external housing 150 and an internal heating surface plate 154 that is removable from the external housing. This embodiment of the handheld clamp device is shown in FIG. 14.

Accordingly, a kit (not shown) may include a device 101 that comprises a first golf ball receiving unit external housing 150, and a second golf ball receiving unit external housing 152. This kit may further include a set of at least two plate pairs (not shown), wherein each plate in each pair of plates can be removably attached to at least one of the first golf ball receiving unit external housing 150 and the second golf ball receiving unit external housing 152. Further, each pair of plates may have a different pattern on the internal heating surfaces thereof. These different patterns may be the same as, or different from, the first pattern 511, the second pattern 512 and the third pattern 513. Namely, the different patterns on the plates may all be different dimple patterns, different dimple patterns having the same total dimple volume, or each dimple pattern may correspond to different play characteristics. Such kits may be used by a golfer as described above, but the golfer may change the plates instead of changing the golf ball receiving units.

Figure 19:
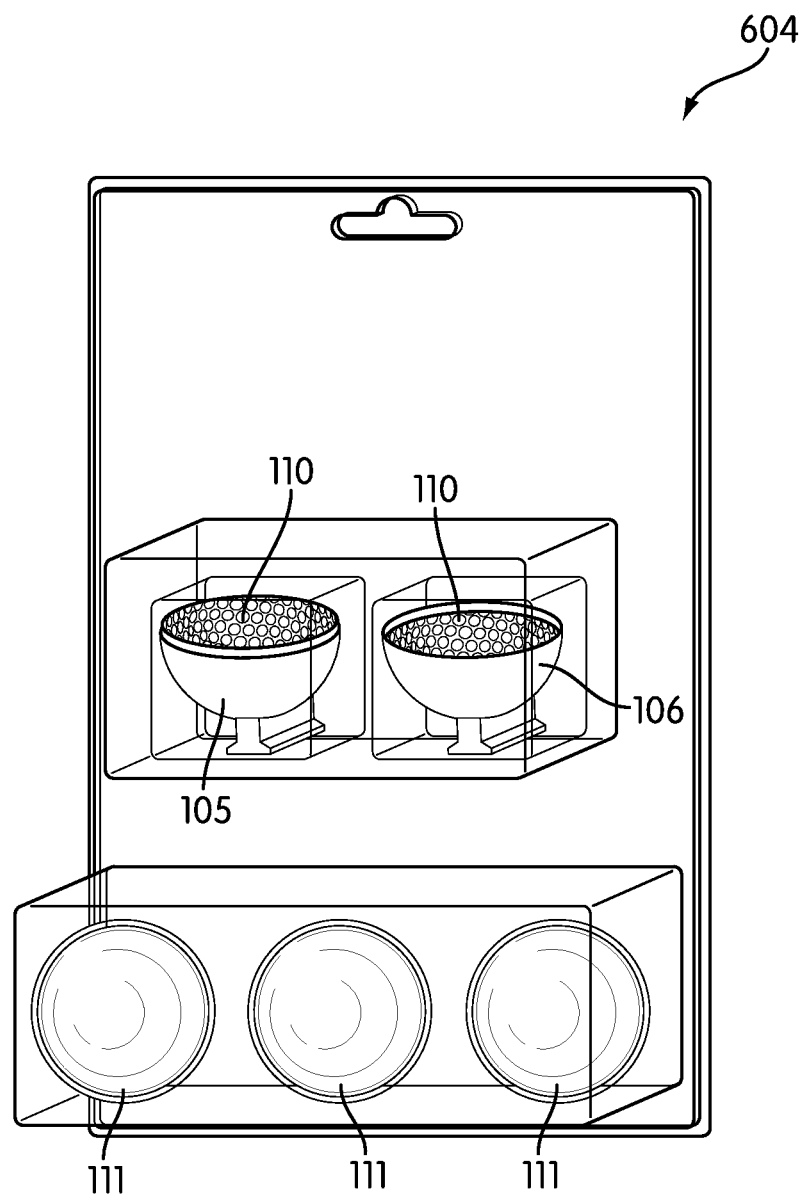
FIG. 19 shows an embodiment of a kit including one pair of golf ball receiving units and several golf balls.

Finally, another embodiment of a kit 604 may include a set of at least one pair of golf ball receiving units, or at least one pair of plates, in addition to at least one golf ball. For example, as shown in FIG. 19, kit 604 may include just one pair of golf ball receiving units, a first golf ball receiving unit 105 and a second golf ball receiving unit 106. These golf ball receiving units 105 and 106 are otherwise the same as discussed variously above, i.e., they can include a heating element 406, an attachment mechanism 180 or 181 for attaching to the device 101, and a dimple pattern 110 on each internal heating surface thereof.

The at least one finished golf ball 111 in this kit may be as discussed above. Specifically, the golf ball in this kit may have a cover layer that is capable of being embossed by the pattern 110 when the device heats the golf ball 111. In particular, the golf ball cover layer should be capable of being embossed at a temperature of less than about 140° C.

A user may purchase or use this kit 604 when the user is already in possession of the device 101, but desires to replace or supplement the set of golf ball receiving unit pairs 550, or plates, with another pair.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:
1. A device for heating a golf ball, the device comprising:
a first lever arm, wherein the first lever arm has a first proximal end and a first distal end, wherein the first proximal end and the first distal end are separated by a first lever arm length of the first lever arm;
a second lever arm, wherein the second lever arm has a second proximal end and a second distal end, wherein the second proximal end and the second distal end are separated by a second lever arm length of the second lever arm;
a pivot associated with both the first proximal end and the second proximal end;
a plurality of golf ball receiving units, including a first golf ball receiving unit associated with the first distal end and a second golf ball receiving unit associated with the second distal end;
wherein the first golf ball receiving unit includes a first heating element, the first golf ball receiving unit includes a first pattern on a first internal surface whereby the device imparts the first pattern to the golf ball contained in the first golf ball receiving unit when the first heating element heats the golf ball, wherein the first pattern corresponds to a first reverse dimple pattern, the first golf ball receiving unit is hemispherically cup-shaped, the first golf ball receiving unit has a first internal diameter that is approximately the same as a diam- eter of a golf ball, and the first golf ball receiving unit is attached to the first distal end by a first attachment mechanism;

wherein the second golf ball receiving unit includes a second heating element, the second golf ball receiving unit includes a second pattern on a second internal surface whereby the device imparts the second pattern to the golf ball contained in the second golf ball receiving unit when the second heating element heats the golf ball, wherein the second pattern corresponds to a second reverse dimple pattern, the second golf ball receiving unit is hemispherically cup-shaped, the second golf ball receiving unit has a second internal diameter that is approximately the same as a diameter of a golf ball, and the second golf ball receiving unit is attached to the second distal end by a second attachment mechanism.

2. The device of claim 1, wherein
the first attachment mechanism is configured such that the first golf ball receiving unit is removably attached to the first distal end;
the second attachment mechanism is configured such that the second golf ball receiving unit is removably attached to the second distal end.

3. The device of claim 2, wherein
the first attachment mechanism comprises a tongue and groove mechanism; and
the second attachment mechanism comprises a tongue and groove mechanism.

4. The device of claim 2, wherein
the first attachment mechanism comprises a male/female interlocking system; and
the second attachment mechanism comprises a male/female interlocking system.

5. The device of claim 1, wherein the first internal diameter is about 1.68 inches, and the second internal diameter is about 1.68 inches.

6. The device of claim 1, wherein
the first attachment mechanism is located between the first golf ball receiving unit and the first distal end, and the first attachment mechanism extends at a ninety degree angle from a first axis that is along a length of the first lever arm;
wherein the first golf ball receiving unit has a first side and a second side, the second side opposing the first side, wherein the first side includes an opening for the golf ball and the first attachment mechanism is disposed on the second side;
the second attachment mechanism is located between the second golf ball receiving unit and the second distal end, and the second attachment mechanism extends at a ninety degree angle from a second axis that is along a length of the first level arm;
wherein the second golf ball receiving unit has a third side and a fourth side, the fourth side opposing the third side, wherein the third side includes an opening for the golf ball and the second attachment mechanism is disposed on the second fourth side.

7. A device heating a golf ball, the device comprising:
a first lever arm, wherein the first lever arm has a first proximal end and a first distal end, wherein the first proximal end and the first distal end are separated by a first lever arm length of the first lever arm;
a second lever arm, wherein the second lever arm has a second proximal end and a second distal end, wherein the second proximal end and the second distal end are separated by a second lever arm length of the second lever arm;
a pivot associated with both the first proximal end and the second proximal end;
a plurality of golf ball receiving units, including a first golf ball receiving unit associated with the first distal end and a second golf ball receiving unit associated with the second distal end;
wherein the first golf ball receiving unit includes a first heating element, the first golf ball receiving unit includes a first pattern on a first internal surface whereby the device imparts the first pattern to the golf ball contained in the first golf ball receiving unit when the first heating element heats the golf ball, wherein the first pattern corresponds to a first reverse dimple pattern, the first golf ball receiving unit is hemispherically cup-shaped, the first golf ball receiving unit has a first internal diameter that is approximately the same as a diameter of a golf ball; and the first golf ball receiving unit is removably attached to the first distal end by a first attachment mechanism; and
wherein the second golf ball receiving unit includes a second heating element, the second golf ball receiving unit includes a second pattern on a second internal surface whereby the device imparts the second pattern to the golf ball contained in the second golf ball receiving unit when the second heating element heats the golf ball, wherein the second pattern corresponds to a second reverse dimple pattern, the second golf ball receiving unit is hemispherically cup-shaped, the second golf ball receiving unit has a second internal diameter that is approximately the same as a diameter of a golf ball; and the second golf ball receiving unit is removably attached to the second distal end by a second attachment mechanism.

8. The device of claim 7, wherein
the first golf ball receiving unit comprises a first external housing and a first internal heating surface plate, wherein the first external housing is fixedly attached to the first attachment mechanism; and
the second golf ball receiving unit comprises a second external housing and a second internal heating surface plate, wherein the second external housing is fixedly attached to the second attachment mechanism.

9. The device of claim 8, wherein
the first heating element is located between the first external housing and the first internal heating surface plate; and
the second heating element is located between the second external housing and the second internal heating surface plate.

10. The device of claim 7, wherein
the first attachment mechanism is selected from the group consisting of a tongue and groove mechanism and a male/female interlocking system; and
the second attachment mechanism is selected from the group consisting of a tongue and groove mechanism and a male/female interlocking system.

11. The device of claim 7, wherein at least one of the first golf ball receiving unit and the second golf ball receiving unit further comprises:
at least one structure on the internal surface that is configured to orient a golf ball in a specific orientation when the golf ball is placed in the at least one of the first golf ball receiving unit and the second golf ball receiving unit.

12. The device of claim 11, wherein the at least one structure comprises a pin extending from at least one of the first internal heating surface and the second internal heating surface.

13. The device of claim 7, further comprising a latch mechanism,
wherein the latch mechanism has an engaged state and a dis-engaged state, and wherein the latch mechanism is configured to hold the first golf ball receiving unit and the second golf ball receiving unit together when in the engaged state.

14. The device of claim 13, wherein the latch mechanism is connected to an automatic release mechanism;
wherein the automatic release system comprises a temperature sensor, a controller, and a trigger;
wherein the controller is programmed to initiate the trigger, so as to alter the latch mechanism from the engaged state to the disengaged state, based on a input from the temperature sensor.

15. The device of claim 7, wherein the first internal diameter is about 1.68 inches, and the second internal diameter is about 1.68 inches.

16. A device for heating a golf ball, the device comprising:
a first lever arm, wherein the first lever arm has a first proximal end and a first distal end, wherein the first proximal end and the first distal end are separated by a first lever arm length of the first lever arm;
a second lever arm, wherein the second lever arm has a second proximal end and a second distal end, wherein the second proximal end and the second distal end are separated by a second lever arm length of the second lever arm;
a pivot associated with both the first proximal end and the second proximal end;
a plurality of golf ball receiving units, including a first golf ball receiving unit associated with the first distal end and a second golf ball receiving unit associated with the second distal end;
wherein the first golf ball receiving unit is hemispherically cup shaped, the first golf ball receiving unit has a first internal diameter that is approximately the same as a diameter of a golf ball, the first golf ball receiving unit comprises a first external housing and a first internal heating surface, and the first golf ball receiving unit includes a first heating element;
wherein the first external housing is fixedly attached to the first distal end by a first attachment mechanism, and the first internal heating surface comprises a first plate that is removably attached to the first external housing;
wherein the first internal heating surface includes a first pattern thereon, such that the device imparts the first pattern to the golf ball contained in the first golf ball receiving unit when the first heating element heats the golf ball, wherein the first pattern corresponds to a first reverse dimple pattern;
wherein the second golf ball receiving unit is hemispherically cup shaped, the second golf ball receiving unit has a second internal diameter that is approximately the same as a diameter of a golf ball, the second golf ball receiving unit comprises a second external housing and a second internal heating surface, and the second golf ball receiving unit includes a second heating element;
wherein the second external housing is fixedly attached to the second distal end by a second attachment mechanism, and the second internal heating surface comprises a second plate that is removably attached to the second external housing; and
wherein the second internal heating surface includes a second pattern thereon, such that the device imparts the second pattern to the golf ball contained in the second golf ball receiving unit when the second heating element heats the golf ball, wherein the second pattern corresponds to a second reverse dimple pattern.

17. The device of claim 16, wherein
the first internal heating surface plate is configured such that the first internal heating surface plate may be completely removed from the first external housing, and replaced with a different internal heating surface plate having a different pattern thereon; and
the second internal heating surface plate is configured such that the second internal heating surface plate may be completely removed from the second external housing, and replaced with a different internal heating surface plate having a different pattern thereon.

18. The device of claim 16, wherein
the first reverse dimple pattern and the second reverse dimple pattern are substantially the same pattern; and
the first reverse dimples pattern and the second reverse dimple pattern correspond to a desired play characteristic of the golf ball.

19. The device of claim 16, wherein the first heating element is part of the first external housing; and the second heating element is part of the second external housing.

20. The device of claim 16, wherein the first external housing and the second external housing further comprise a latch mechanism;
wherein the latch mechanism is configured to hold the first golf ball receiving unit and the second golf ball receiving unit together when engaged;
wherein the latch mechanism is connected to a manual release mechanism, wherein the manual release mechanism is configured to release the latch mechanism upon a user initiated input.

21. The device of claim 16, wherein
the first heating element is a first electrical heating element, and the second heating element is an second electrical heating element; and
the device further includes at least one of a battery and a port for connecting an external source of electricity.

22. The device of claim 16, wherein
the first attachment mechanism is located between the first golf ball receiving unit and the first distal end, and the first attachment mechanism extends at a ninety degree angle from a first axis that is along a length of the first lever arm;
wherein the first golf ball receiving unit has a first side and a second side, the second side opposing the first side, wherein the first side includes an opening for the golf ball and the first attachment mechanism is disposed on the second side;
the second attachment mechanism is located between the second golf ball receiving unit and the second distal end, and the second attachment mechanism extends at a ninety degree angle from a second axis that is along a length of the first level arm;
wherein the second golf ball receiving unit has a third side and a fourth side, the fourth side opposing the third side, wherein the third side includes an opening for the golf ball and the second attachment mechanism is disposed on the second fourth side.

* * * * *